United States Patent
Baron et al.

(10) Patent No.: US 12,550,193 B2
(45) Date of Patent: Feb. 10, 2026

(54) PROVISION PERIOD MANAGEMENT FOR ENSURING A LOW LATENCY SERVICE IN A BSS

(71) Applicant: CANON KABUSHIKI KAISHA, Tokyo (JP)

(72) Inventors: Stéphane Baron, Le Rheu (FR); Patrice Nezou, Liffre (FR); Pascal Viger, Janze (FR)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 18/248,369

(22) PCT Filed: Oct. 19, 2021

(86) PCT No.: PCT/EP2021/078992
§ 371 (c)(1),
(2) Date: Apr. 7, 2023

(87) PCT Pub. No.: WO2022/084341
PCT Pub. Date: Apr. 28, 2022

(65) Prior Publication Data
US 2023/0389078 A1    Nov. 30, 2023

(30) Foreign Application Priority Data

Oct. 20, 2020 (GB) ...................... 2016640
Dec. 10, 2020 (GB) ...................... 2019533
Feb. 19, 2021 (GB) ...................... 2102411

(51) Int. Cl.
H04W 74/0816   (2024.01)
H04W 74/00   (2009.01)

(52) U.S. Cl.
CPC ..... *H04W 74/0816* (2013.01); *H04W 74/006* (2013.01)

(58) Field of Classification Search
CPC ................. H04W 74/006; H04W 74/0816; H04W 84/12
See application file for complete search history.

(56) References Cited

U.S. PATENT DOCUMENTS 11,601,922 B1 *  3/2023  Chu .................... H04W 72/121
2019/0045461 A1  2/2019  Fang et al.
(Continued)

FOREIGN PATENT DOCUMENTS

WO   WO-2016182390 A1 *  11/2016  .......... H04W 72/044
WO   2022084341 A1   4/2022

OTHER PUBLICATIONS

Chunyu Hu; "Prioritized EDCA Channel Access"; IEEE Draft; 11-20-1045-03-00BE-PRIORITIZED-EDCA-CHANNEL-ACCESS, IEEE-SA MENTOR; vol. vol. 802 .11 EHT; 802.11be, No. 3; Aug. 26, 2020; XP068172273; (Retrieved from the Internet); URL:https://mentor.ieee.org/802.11/dcn/20/11-20-1045-03-00be-prioritized-edca-channel-access.pptx (retrieved on Aug. 26, 2020); pp. 1-43.

(Continued)

*Primary Examiner* — Kashif Siddiqui
(74) *Attorney, Agent, or Firm* — Canon U.S.A., Inc. IP Division

(57) ABSTRACT

To make effective the usage of network resources and timely handling of low latency traffic, and in particular IEEE 802.11 networks, it is described according to an aspect of the invention a method of communication comprising, at an access-point, AP: contending for access to a wireless medium, a provision period prior a start of a low latency, LL, service period, SP, dedicated for transmitting LL traffic; and upon gaining access to the wireless medium, reserving an AP transmission opportunity encompassing the LL SP, thereby allowing transmission of LL traffic during the LL SP.

14 Claims, 19 Drawing Sheets

(56) References Cited

U.S. PATENT DOCUMENTS

| | | | | |
|---|---|---|---|---|
| 2019/0200387 A1* | 6/2019 | Chitrakar | .............. | H04W 28/20 |
| 2020/0374854 A1* | 11/2020 | Kim | ..................... | H04W 84/12 |
| 2023/0189339 A1* | 6/2023 | Kim | ................. | H04W 74/0816 |
| | | | | 370/338 |

OTHER PUBLICATIONS

Dave Cavalcanti; "Enhancements for QoS and low latency in 802.11be R1"; IEEE Draft; 11-20-1350-00-00BE-ENHANCEMENTS-FOR-QOS-AND-LOW-LATENCY-IN-802-11BE-RI, IEEE-SA MENTOR; vol. 802.11 EHT; 802.11be: Aug. 28, 2020; XP068172364; URL:https://mentor.ieee.org/802.11/dcn/20/11-20-1350-00-00be-enhancements-for-qos-and-low-latency-in-802-11be-rl.pptx (retrieved on Aug. 28, 2020); pp. 1-17.

Patrice Nezou (Canon); "Low-Latency Triggered TWT"; IEEE Draft; 11-20-1843-02-00BE-LOW-LATENCY-Triggered-TWT, IEEE-SA MENTOR; vol. 802.11 EHT; 802.11be, No. 2; Dec. 17, 2020; XP068175533; URL: https://mentor.ieee.org/802.11/dcn/20/11-20-1843-02-00be-low-latency-triggered-twt.pptx (Retrieved on Dec. 17, 2020); pp. 1-14.

Stephane Baron (Canon); "Low-Latency Triggered TWT"; IEEE Draft; 11-20-1843-01-00BE-LOW-LATENCY-TRIGGERED-TWT, IEEE-SA MENTOR; vol. 802.11 EHT; 802.11be, No. 1; Dec. 9, 2020; XP068175434; Retrieved from the Internet: URL:https://mentor.ieee.org/802.11/dcn/20/11-20-1843-01-00be-low-latency-triggered-twt.pptx (retrieved on Dec. 9, 2020); pp. 1-13.

* cited by examiner

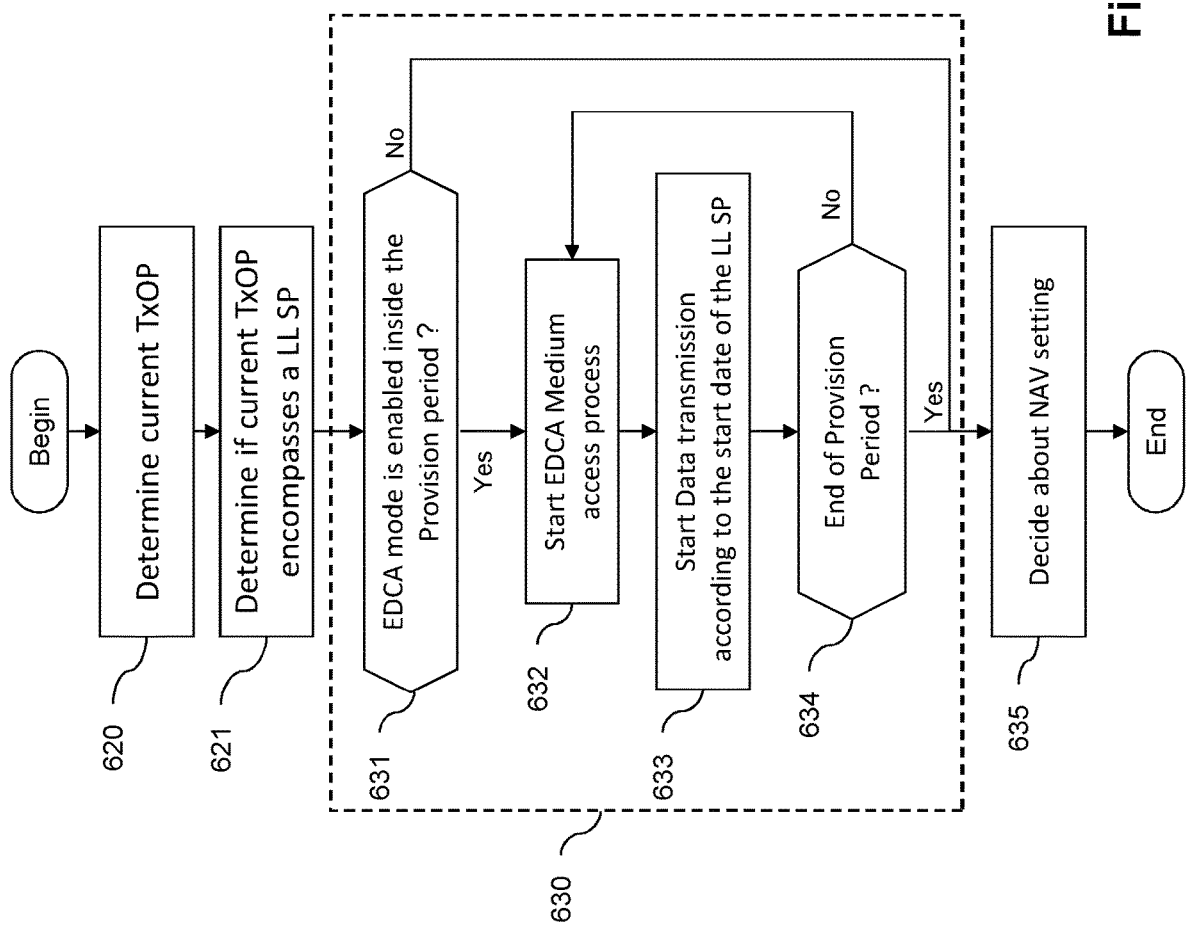

PROVISION PERIOD MANAGEMENT FOR ENSURING A LOW LATENCY SERVICE IN A BSS

CROSS-REFERENCE TO RELATED APPLICATIONS

This application is the National Phase entry of International Application No. PCT/EP2021/078992, filed on Oct. 19, 2021 and titled "PROVISION PERIOD MANAGEMENT FOR ENSURING A LOW LATENCY SERVICE IN A BSS". This application claims the benefit under 35 U.S.C. § 119(a)-(d) of United Kingdom Patent Application No. 2016640.1, filed on Oct. 20, 2020 and entitled "PROVISION PERIOD MANAGEMENT FOR ENSURING A LOW LATENCY SERVICE IN A BSS", of United Kingdom Patent Application No. 2019533.5, filed on Dec. 10, 2020 and entitled "PROVISION PERIOD MANAGEMENT FOR ENSURING A LOW LATENCY SERVICE IN A BSS", and of United Kingdom Patent Application No. 2102411.2, filed on Feb. 19, 2021and entitled "PROVISION PERIOD MANAGEMENT FOR ENSURING A LOW LATENCY SERVICE IN A BSS". The above cited patent applications are incorporated herein by reference in their entireties.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The 802.11 family of standards adopted by the Institute of Electrical and Electronics Engineers (IEEE®) provides a great number of mechanisms for wireless communications between stations.

With the development of latency sensitive applications such as online gaming, real-time video streaming, virtual reality, drone or robot remote controlling, better low latency and robustness requirements and issues need to be taken into consideration. For instance, 99.9% of latency sensitive packets should be delivered to the end equipment within a 2 ms latency.

Such problematic issues are currently under consideration by the IEEE 802.11 working group as a main objective to issue the next major 802.11 release, known as 802.11 be or EHT for "Extremely High Throughput".

Low latency reliable services, LLRS, have been defined as targets of such main objective. LLRSs are services provided to a higher layer traffic stream that prioritize and deliver MSDUs (data units) within a worst-case latency budget with a given reliability/packet delivery ratio (PDR) and low jitter.

An efficient QoS management in a BSS (Basic Service Set) is required to provide low latency, LL, reliable services.

SUMMARY OF INVENTION

According to aspects of the invention, for an efficient LLRS management in a BSS, the AP applies measures to guarantee a starting time of a service period dedicated to LLRS traffic transmission without being subject to contention time contingency for accessing the medium.

According to an aspect of the invention, there is provided a communication method in a wireless network, comprising at a station:
  determining a transmission opportunity reserved by an access point, AP, of the wireless network; and
  receiving an indication from the AP, the indication causing the station to not set its Network Allocator Vector, NAV, during a period of the AP transmission opportunity, thereby allowing the station to contend for access to the medium during the period of the transmission opportunity reserved by the AP.

Advantageously, the AP transmission opportunity encompasses a provision period prior a start of a low latency, LL, service period, SP, dedicated for transmitting LL traffic.

In one implementation, the period during which the station is allowed to access the medium is part or all of the provision period.

In one implementation, the indication causes the station to not set its NAV based on one or more capabilities of the station.

In one implementation, the station does not set its NAV if it is a low latency capable station.

In one implementation, the station has a LL service period protection capability, the capability is for the station to release the medium prior the start of the LL service period.

According to an aspect of the invention, there is provided a communication method in a wireless network, comprising at an access-point, AP:
  contending for access to a wireless medium, a provision period prior a start of a low latency, LL, service period, SP, dedicated for transmitting LL traffic; and
  upon gaining access to the wireless medium, reserving an AP transmission opportunity encompassing the LL SP, thereby allowing transmission of LL traffic during the LL SP.

In particular, the AP further allocating a resource unit during the LL SP for the transmission of the LL traffic.

In one implementation, the AP further sending an indication to stations for setting their Network Allocator Vector, NAV, the indication causing first stations to set their NAV to end with the AP transmission opportunity and second stations to set their NAV to end prior the start of the LL SP.

In a variant, second stations are restricted to transmit only LL traffic during the LL SP. This new mechanism allows the second stations to be ready to transmit or receive at T2 (starting time of the LL SP).

According to embodiments, the method further comprising, at the AP, transmitting a first frame, and wherein the first frame including a signaling that the LL SP starts before the end of the AP transmission opportunity.

According to embodiments, the method further comprising, at the AP, sending an indication to stations for setting their Network Allocator Vector, NAV, the indication causing stations to not set their NAV during a period of AP transmission opportunity, thereby the stations can access the medium during the period.

In one implementation, the indication allows only LL capable stations to not set their NAV during the period.

In another implementation, the period is part or all of the provision period.

According to other aspects of the invention, an efficient LLRS management in a BSS is addressed by considering an optional provision period to adapt to network conditions to ensure efficient network resource usage and timely handling of low latency traffic.

According to an aspect of the invention, there is provided a communication method in a wireless network, comprising at a station:
determining a transmission opportunity reserved by an access point, AP, of the wireless network;
determining if the AP has enabled use of a provision period prior a start of a service period, SP, encompassed in the reserved transmission opportunity; and
If the AP has enabled use of a provision period, determining whether the reserved transmission opportunity starts with the provision period.

According to a further aspect of the invention there is provided a communication method in a wireless network, comprising at an access-point, AP:
advertising that the AP has enabled use of a provision period prior a start of a service period, SP, encompassed in the reserved transmission opportunity; and
contending for access to a wireless medium, a provision period prior the SP starts.

According to yet a further aspect of the invention there is provided a frame designed to be sent by an access point, AP, of a wireless communication network comprising a plurality of stations, the frame comprising: a first field for advertising an enablement status of the AP to use a provision period prior a start of a service period, SP, encompassed in a transmission opportunity reserved by the AP.

Another aspect of the invention relates to a non-transitory computer-readable medium storing a program which, when executed by a microprocessor or computer system in a wireless device, causes the wireless device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:
FIG. 6c illustrates, using a flowchart, operations of a station supporting Low Latency Protection according to embodiments of the invention at the start of a Provision Period.

DETAILED DESCRIPTION OF EMBODIMENTS

Figure 1:
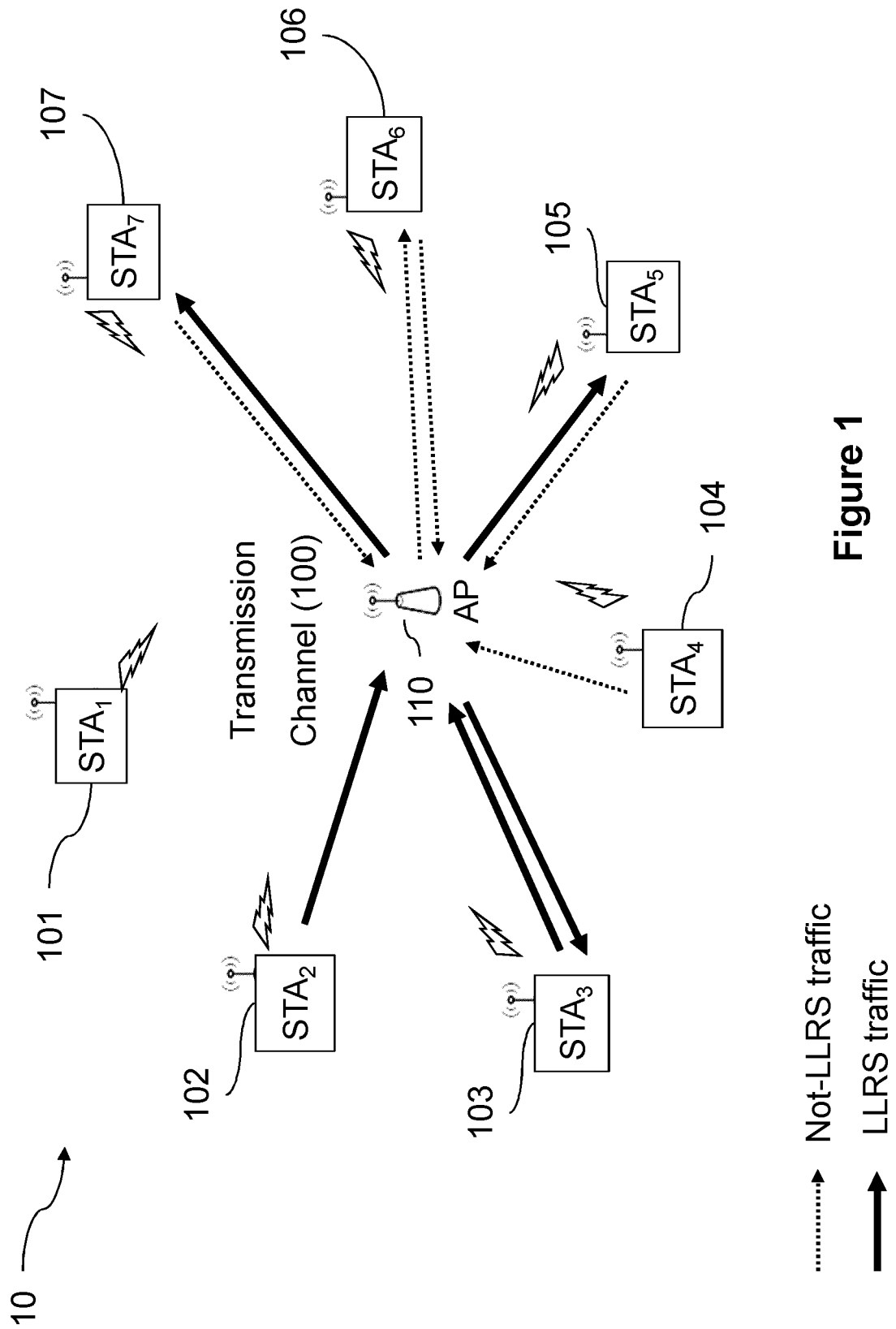
FIG. 1 illustrates a network environment in which embodiments of the invention may be implemented.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. A SDMA system may utilize sufficiently different directions to simultaneously transmit data belonging to multiple user terminals, i.e. wireless devices or stations. A TDMA system may allow multiple user terminals to share the same frequency channel by dividing the transmission signal into different time slots or resource units, each time slot being assigned to a different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. A SC-FDMA system may utilize interleaved FDMA (IFDMA)

to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or STA).

An AP may comprise, be implemented as, or known as a Node B, Radio Network Controller ("RNC"), evolved Node B (eNB), 5G Next generation base station (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

An AP manages a set of stations that together organize their accesses to the wireless medium for communication purposes. The stations (including the AP) form a service set, here below referred to as basic service set, BSS (although other terminology can be used). A same physical station acting as an access point may manage two or more BSSs (and thus corresponding WLANs): each BSS is thus uniquely identified by a specific basic service set identification, BSSID and managed by a separate virtual AP implemented in the physical AP.

Low latency reliable services, LLRS, are services provided to a higher layer traffic stream that prioritize and deliver MSDUs (data units of this traffic stream) within a worst-case latency budget with a given reliability/packet delivery ratio (PDR) and low jitter. Traffic that may be concerned by LLRS includes latency sensitive data, i.e. data from applications such as gaming, media streaming, augmented reality, virtual reality, and so on.

FIG. 1 illustrates an exemplary network environment 10 for delivering LLRS traffic.

Each communication station 101-107 registers to a central station or access point (AP) 110 during an association procedure where the AP assigns a specific Association IDentifier (AID) to the requesting non-AP station. For example, the AID, e.g. a 16-bit value uniquely identifying the non-AP station, is used to identify the stations in frames exchanged. The AP 110 and the associated non-AP stations 101-107 may represent a basic service set (BSS) or an extended service set (ESS).

Once associated with the BSS, the communication stations 101-107, 110 exchange data frames over a radio transmission channel 100 of a wireless local area network (WLAN), under the management of the AP 110. The radio transmission channel 100 is defined by an operating frequency band constituted by a single channel or a plurality of channels forming a composite channel.

Non-AP stations may also communicate directly via a direct wireless link (DiL for direct link), i.e. without the intervention of the AP as relay of their messages. Exemplary situation of direct communications includes the presence of peer-to-peer (P2P) transmissions between non-AP stations having the same primary channel.

The stations 101-107, 110 compete one against the other using EDCA (Enhanced Distributed Channel Access) contention, to gain access to the wireless medium 100 in order to be granted a transmission opportunity (TxOP) and then transmit (single-user, SU) data frames. The stations may also use a multi-user (MU) scheme in which a single station, usually the AP 110, is allowed to schedule a MU transmission, i.e. multiple simultaneous transmissions to or from other stations, during a TxOP granted in the wireless network. One implementation of such a MU scheme has been for example adopted in IEEE 802.11ax amendment standard, as the Multi-User Uplink and Downlink OFDMA (MU UL and DL OFDMA) procedures.

The non-AP stations may represent various devices such as gaming client, augmented/virtual reality headset, smartphones, wireless display and some of them have to exchange (i.e. transmit or/and receives) low-latency or LLRS traffic over time. LLRS traffic has more constrained QoS requirements regarding for instance PDR, jitter and latency, than not-LLRS traffic coexisting in the WLAN 10.

Figure 2:
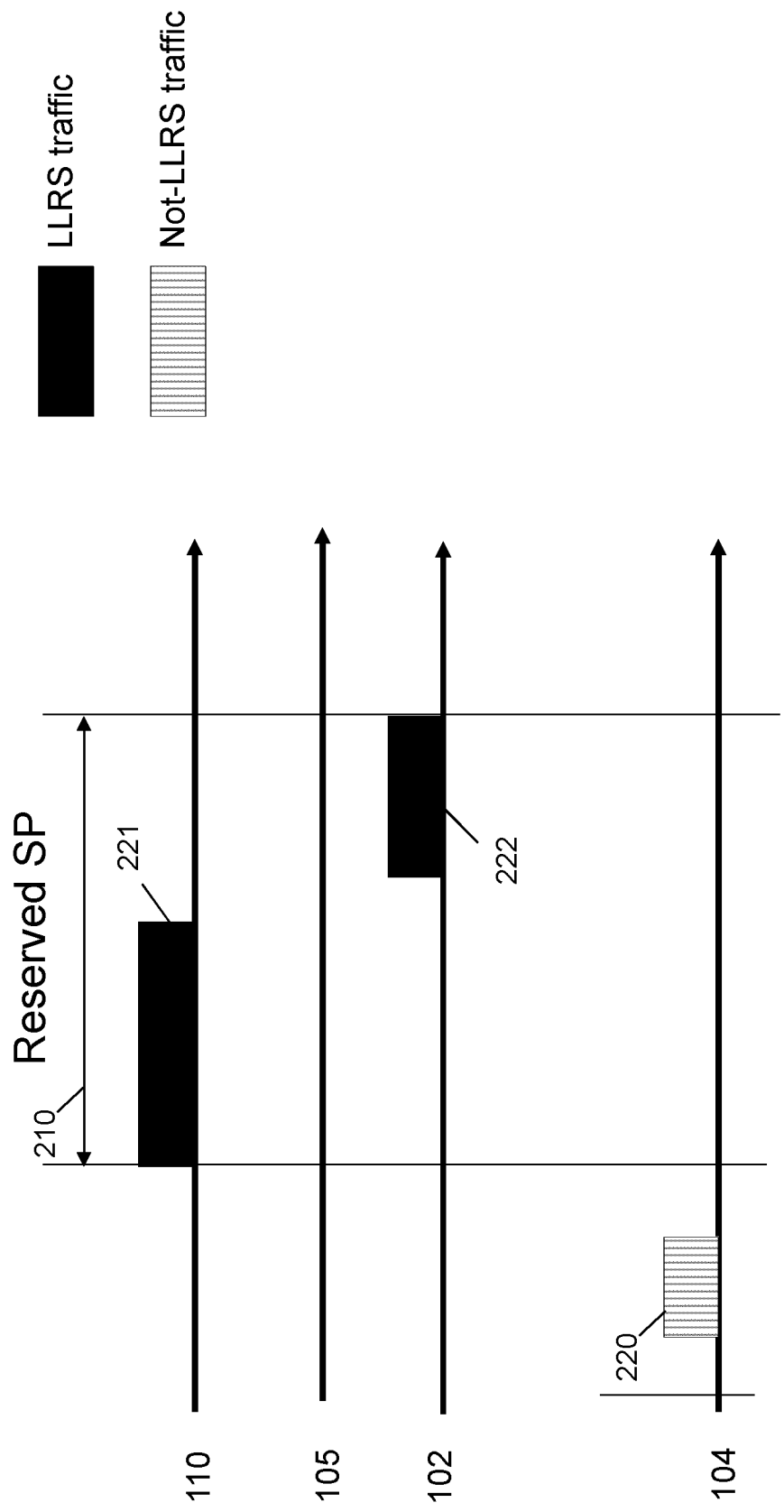
FIG. 2 illustrates use of a service period (SP) to prioritize LLRS traffic over not-LLRS traffic within a BSS.

To prioritize LLRS traffic over non-LLRS traffic within a BSS, a service period (SP) is reserved for LLRS traffic (also referred to as LL SP) as illustrated by FIG. 2.

In the illustration, the AP schedules a reserved service period 210. The AP may announce the starting time and the ending time of the period. The reserved service period 210 may be fully dedicated to LLRS traffic exchange, or in variant may allow both LLRS traffic and non-LLRS traffic. In the figure, it is a reserved LLRS period.

The AP participates to the LLRS traffic exchange (sends 221 to non-AP station 105 and then receives 222 from non-AP station 102) in the reserved service period. However, this is not mandatory. The reserved LLRS period may alternatively be used by non-AP stations to directly exchange P2P LLRS traffic.

For illustration, previously to the reserved service period, non-AP station 104 gains access to the wireless medium 100 and may start transmitting non-LLRS traffic 220. AP 110 can next transmit LLRS traffic 221 to non-AP station 105 and then receives other LLRS traffic 222 from non-AP station 102.

However, measures need to be applied to guarantee the starting time of the service period without being subject to contention time contingency for accessing the medium, i.e. to ensure that the medium is available for LLRS traffic transmission at the time it is needed.

In embodiments of the invention, the reserved service period is a protected Target Wake Time (TWT) service period (referred to as TWT SP or LL TWT SP).

Target Wake Time enables devices to determine when and how frequently they will wake up to send or receive data. TWT allows an AP to manage activity in the network, in order to minimize medium contention between STAs, and to reduce the required amount of time that a STA in the power-save mode needs to be awake. Thanks to this mechanism, a STA can doze except during the TWT service period (SP) intervals.

TWT SPs can be either individually agreed or broadcast. An individual TWT SP is a specific time or set of times negotiated between an AP and a STA (one being referred to as TWT requesting station and the other as TWT responding station) and at which the STA is expected to be awake in order to exchange frames with the AP. During negotiations, they transmit to each other a special information element (TWT IE) which contains TWT parameters and can be interpreted as request, suggestion, demand, alternation, acceptation, dictation, or rejection. Either the AP or the STA can tear down the TWT by transmitting a TWT Teardown frame. The broadcast TWT is similar to an individual TWT except that the specific time or set of times are not negotiated between stations but directly broadcast by an AP to multiple non-AP stations, e.g. using a beacon frame. In that case, the AP uses another mechanism based on a TIM element to indicate the set of STAs towards which the AP is going to transmit (Downlink data— DL) or which the AP is going to trigger for uplink traffic. If a STA is not indicated in a TIM element, it means that it will not be solicited within the next TWT SP.

Figure 10A:
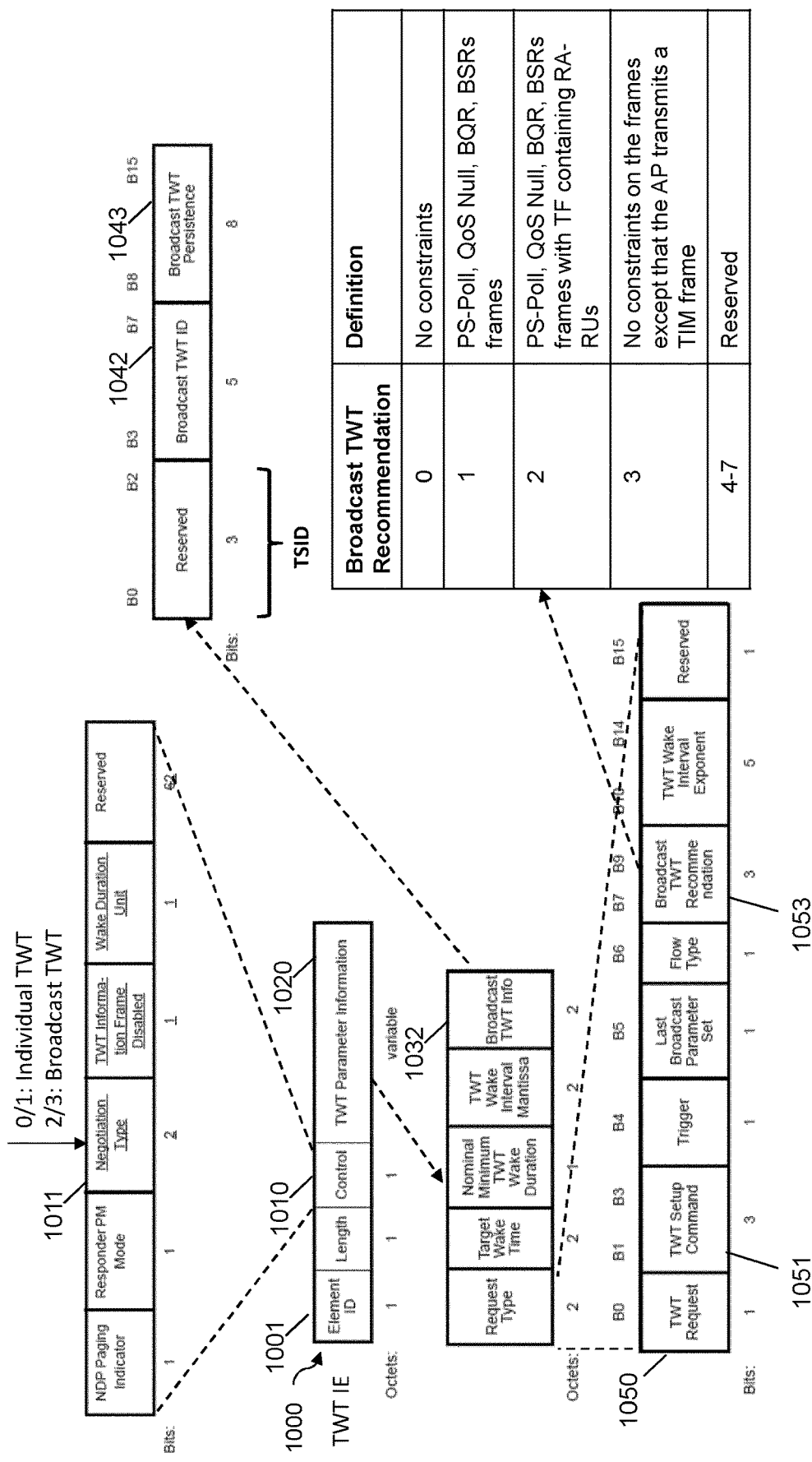
FIG. 10a illustrates a format of a conventional TWT Information Element (IE)

FIG. 10a illustrates a format of a conventional TWT IE.

The TWT IE 1000 is identified by an Element ID 1001 and comprises a field 1020 for transporting TWT parameter information. The "Control" field 1010 allows to detect a broadcast TWT through the "Negotiation Type" field 1011. The MSB bit of this field is set to 1 to promote a broadcast TWT. Next, the TWT scheduling AP sets the "TWT Request" subfield 1050 to 0 and the TWT Setup Command subfield 1051 as "Accept" to announce the next TWT SP, as "Alternate" to announce the next TWT SP with a new set of TWT parameters and as "Reject" to tear down a broadcast TWT (the ending date is identified in the "Broadcast TWT Persistence" subfield 1043. The broadcast TWT includes a broadcast TWT info field 1032 defining the set of TWT parameters. Each broadcast TWT info field is identified by a "Broadcast TWT ID" field 1042 allowing an AP to schedule multiple sets of broadcast TWT SPs with different sets of TWT parameters. A STA may request to become a member of a broadcast TWT by transmitting a frame to its associated AP that contains a TWT element with the "Negotiation Type" subfield 1011 set to 3 and the "TWT Setup Command" field 1051 set to "Request TWT" or "Suggest TWT" or "Demand TWT". The attached TWT Parameter set indicates the Broadcast TWT ID of the broadcast TWT that the STA is requesting to join.

The "Broadcast TWT Recommendation" field 1053 is used in the 802.11 standard to advise STAs to send PS-Poll, QoS Null, BQR or BSR frames when they are solicited by the AP. But it is only a recommendation. If STAs wants to transmit any other kinds of frames, there is no pure restriction.

However, an established TWT SP itself does not forbid other STAs to access the channel. So, TWT does not provide contention-free channel access and the STAs transmit frames in TWT SPs using legacy channel access methods.

The foregoing concerns are addressed according to an aspect of the invention by considering an AP-centric approach in which the AP takes measures to guarantee timely transmission of LL traffic during the LL SP.

According to this aspect, one measure is for the AP to start contending access to the medium a provision period (PP) prior the start of the service period so that to increase chances of taking control of the medium. The AP may increase chances by taking a longer PP and optionally setting a transmission opportunity parameter of the AP much greater (e.g. 2 or 3 times) than the transmission opportunities of the stations so that the transmission opportunity of the AP encompasses both PP and SP. As there is a maximum time limit of the transmission opportunity setting, the AP may shorten the transmission opportunities of the stations. The AP may act only on the transmission opportunity of the AP, only on the transmission opportunities of the stations, or on both.

Figure 3:
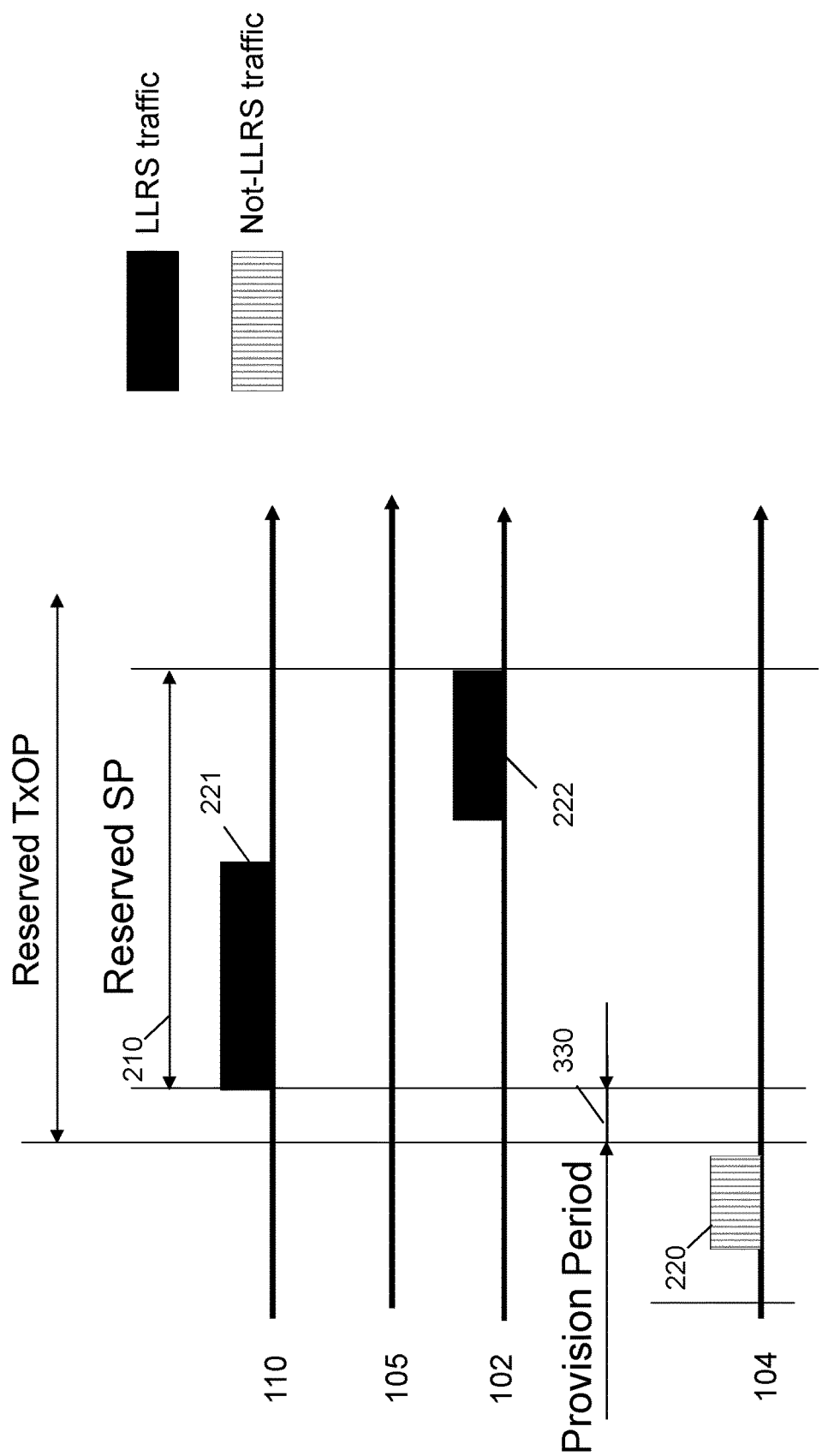
FIG. 3 illustrates the use of a provision period by an AP to take control of the wireless medium and to enable scheduling transmissions during a service period restricted to LL traffic.

FIG. 3 illustrates a provision period 330 during which the AP contends for access to the medium prior the LL SP.

Note that the AP may enable scheduling transmissions during the service period that are restricted to LL traffic. Implementation of this method may be that the AP allocates resources for LL traffic transmission (e.g. by allocating multi-user downlink and/or uplink resource units). Another implementation may be that the AP authorizes LL STAs to contend for access during the LL SP (e.g. using EDCA) for exchanging LL traffic while non-LL STAs view the medium as busy during that same period. The authorization may be a beforehand agreement between the AP and LL STAs to be allowed to not set their NAVs to be able to contend for access if the medium is let idle by the AP.

Figure 4:
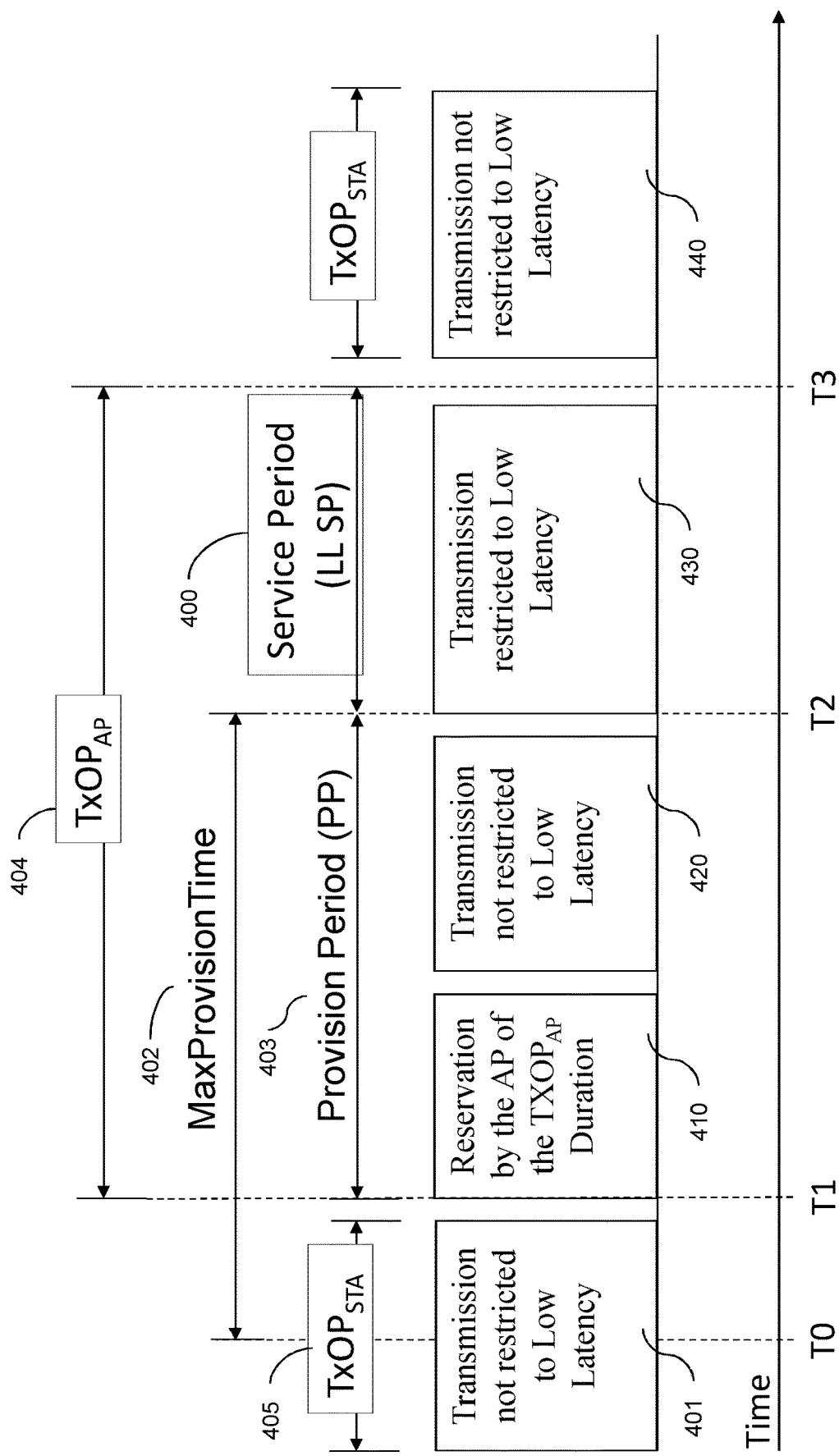
FIG. 4 illustrates a time sequence for scheduling the starting time of a LL service period according to embodiments of the invention.

FIG. 4 illustrates a time sequence for scheduling the starting time of a LL service period 400 according to embodiments of the invention.

The following times are considered in these embodiments.

T2 is the starting time of the LL SP 400 as announced by the AP. The announcement may be done for instance by indicating the value T2 in a beacon frame previously transmitted by the AP. The Provision Period serves as NAV protection, and ensures an accurate starting time (T2) for the LL TWT SP.

T0 is the starting time of a maximum provision period (MaxProvisionTime) that can be setup at the AP. T0 can be determined by the AP by subtracting MaxProvisionTime 402 from T2:

$$T0=T2-\text{MaxProvisionTime}.$$

MaxProvisionTime 402 may for instance be set at system initial setup, e.g. hardcoded according to the network specification, or configured by the administrator of the AP. An example value may be MaxProvisionTime=2× TxOPLimit$_{STA}$, where TxOPLimit$_{STA}$ is the maximum value of the Transmission opportunity duration that can be chosen by stations registered with the AP.

T1 indicates the start of the Provision Period (PP) 403. For example, T1 is equal to the first instant at which the medium becomes free after T0. This corresponds to the starting time of the medium access procedure (e.g. EDCA procedure) of the AP that will lead the AP to gain access to the medium for starting transmission at a time T1$_{bis}$ (not illustrated). The AP may take benefit of the Provision Period 403 to communicate with stations not concerned by the coming LL SP, while securing the effective starting time of that LL SP.

T3 corresponds to the end of the LL SP 400.

If an AP gains access to the medium before T0, the AP maximum transmission opportunity (TXOP$_{AP}$) is limited by the conventional maximum TxOP value. But if the AP gains access to the medium between T0 and T2, the AP is allowed to extend its TxOP value to encompass the duration of the LL SP.

In a variant, the value of the TxOP reserved by the AP ($TXOP_{AP}$) has a fixed value when accessing the medium during the MaxProvisionTime 402.

In one implementation, the AP may start attempting to access the medium from time T0 even if the AP has no data to transmit or data to poll from stations in order to secure the start of the LL SP. FIG. 5b, detailed below, illustrates one variant of this implementation in which the AP sends a data packet with only padding to a virtual station (invalid or non-registered Receiving address set in the RA field of the frame). This variant can also be used when the AP gains access to the medium a very short time before the start of the LL SP which does not allow to have a minimal full transmission (data transmission and corresponding ack reception).

At T1, the AP starts the medium access mechanism using for example the conventional EDCA procedure. At the end of a successful backoff procedure of the EDCA, the AP gains access to the medium and, at $T1_{bis}$, the AP starts sending a first frame 410. Frame 410 indicates a transmission opportunity duration ($TXOP_{AP}$ value 404) encompassing the coming LL SP. In the example of FIG. 4, this $TXOP_{AP}$ value 404 corresponds to the time difference between T3, that is the end of the LL SP period 400, and $T1_{bis}$:

$$TxOP_{AP}=T3-T1_{bis}.$$

In another embodiment, the $TXOP_{AP}$ value 404 can be greater than the former determination ($T3-T1_{bis}$) and allows further transmission by the AP or other STAs in the same TxOP after the end of the LL SP period 400, and before the end of the $TXOP_{AP}$ period 404.

In another embodiment, the $TXOP_{AP}$ value 404 can be fixed (typically $3 \times TxOPLimit_{STA}$), especially when the LL SP duration is equal to $TxOPLimit_{STA}$ 405.

FIGS. 5a to 5e illustrate various implementations for scheduling a provision period and a service period.

Different frame types can be used to signal a TxOP duration by the AP (referred to hereinafter as signaling frame). For instance, the AP may send any kind of trigger frame 500 (as defined by the 802.11ax amendment standard) that initiates a Multi User Uplink transmission, a Multi User Physical Packet Data Unit (MU PPDU) that simultaneously transmit data to multiple receivers, a Request-To-Send (RTS) frame, a Clear-To-Send (CTS) frame 560, a Single User Physical Packet Data Unit (SU PPDU) 570, or any kind of frame initiating a communication with other stations.

By setting the TxOP value (indicating the length of the transmission) to the $TXOP_{AP}$ value 404, the AP indicates to all stations listening the preamble of the frame (registered to the AP or not) that the medium will be busy until the end of the TxOP. Upon reception of this frame, and according to embodiments of the invention, all the stations that should not participate to the LL SP, will set their Network Allocator Vector (NAV) and then will not try to access the medium until the end of the TxOP value. This protect the effective start of the LL SP period. The NAV is a value that indicates the duration during which the medium will be busy, so if the NAV period didn't expire, a station is not supposed to try to access the medium.

In the contrary, upon reception of the signaling frame transmitted by the AP, the stations that should participate and are concerned by the LL SP (as emitter, receiver or both), set their NAV only until T2, without considering the effective value of the TxOP indicated by the AP. This new mechanism allows the stations to be ready to transmit or receive at T2 (starting time of the LL SP).

In a variant, this special behavior of stations can be controlled by an LSP indication (LL SP Present) present in the frame transmitted by the AP during the transmission period 410 (reservation period). For example, the frame may contain an indication that the indicated TxOP duration encompasses a LL service period. In this variant, a LL STA that has LL traffic to transmit and/or receive during the LL SP 400 checks this indication to determine the actual duration of its NAV as either the value of the TxOP or until T2 if the indication shows that a LL SP is encompassed in the TxOP.

In order to guarantee the start of the LL SP 400 at T2, the AP stops transmission 420 a Short Inter Frame Space (SIFS) before T2. For that, the AP determines the duration of the Downlink (DL) or Multi User Down Link (MU DL) traffic and corresponding Acknowledgments, or the duration of the triggered Uplink traffic (indicated in the UL_Length field of the frame triggering the MU UL traffic, cf. FIG. 8b) and associated acknowledgment from the AP.

At the starting of the LL SP 400, either the AP gains back the medium for a transmission to stations involved in the LL SP, or one of the LL STAs (102 or 103 for instance) accesses the medium.

To avoid collision between transmissions of the AP and the LL STAs at the start of the LL SP 400, the AP may optionally include an indicator EDCA_Enabled that indicates, in a frame transmitted by the AP during the transmission period 410, if the LL SP 400 will start with a first transmission by the AP or if the LL SP 400 is available for a classical EDCA medium access from any LL SP STAs, or from a specific LL SP STA. This indication may also be included in the declaration of the LL SP for instance in an information element of a beacon frame.

Figure 5A:
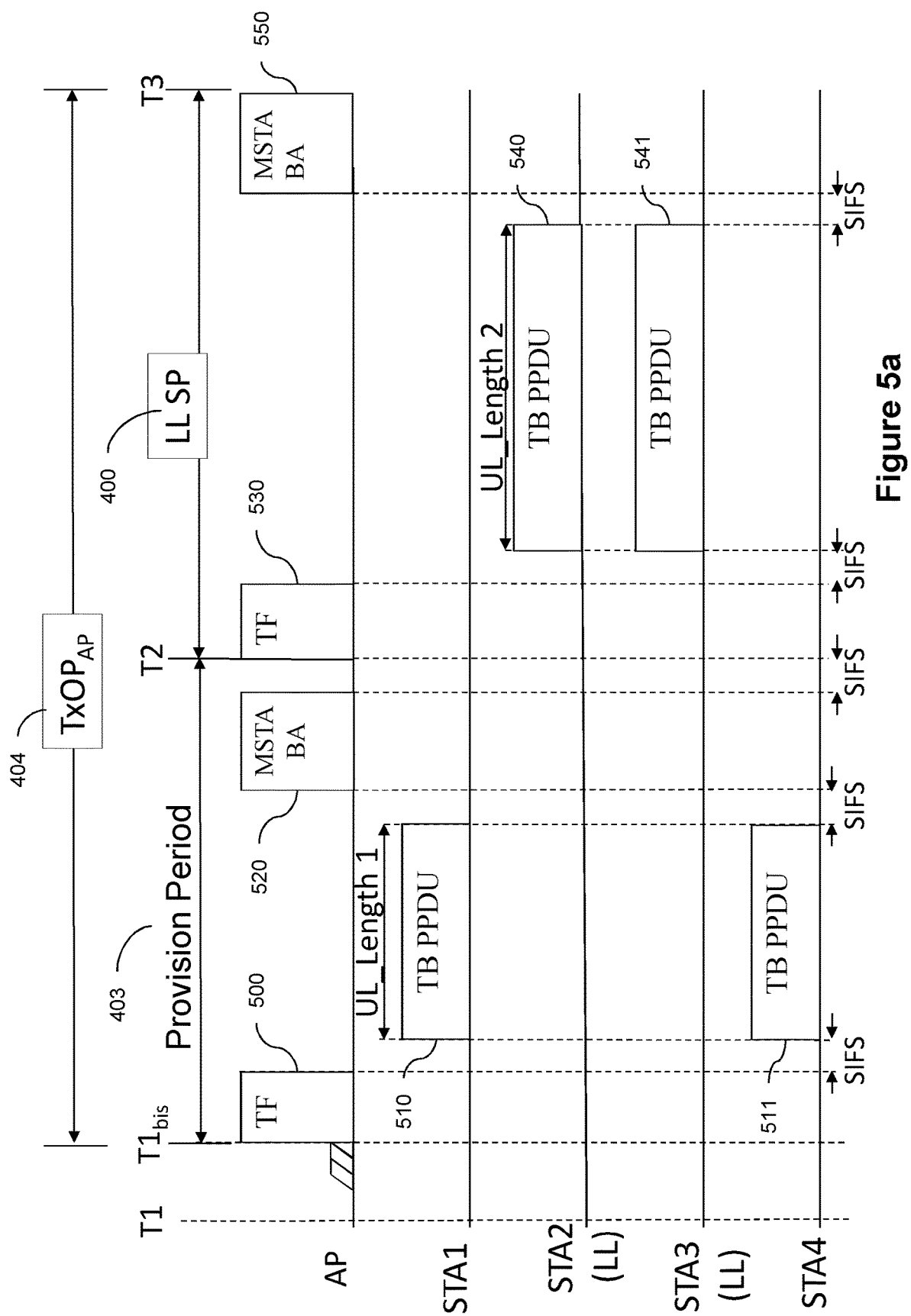
FIGS. 5a to 5e describe implementations of embodiments of the invention by illustrating different examples about the way the AP may handle the Provision Period and the Service Period.
Figure 5B:
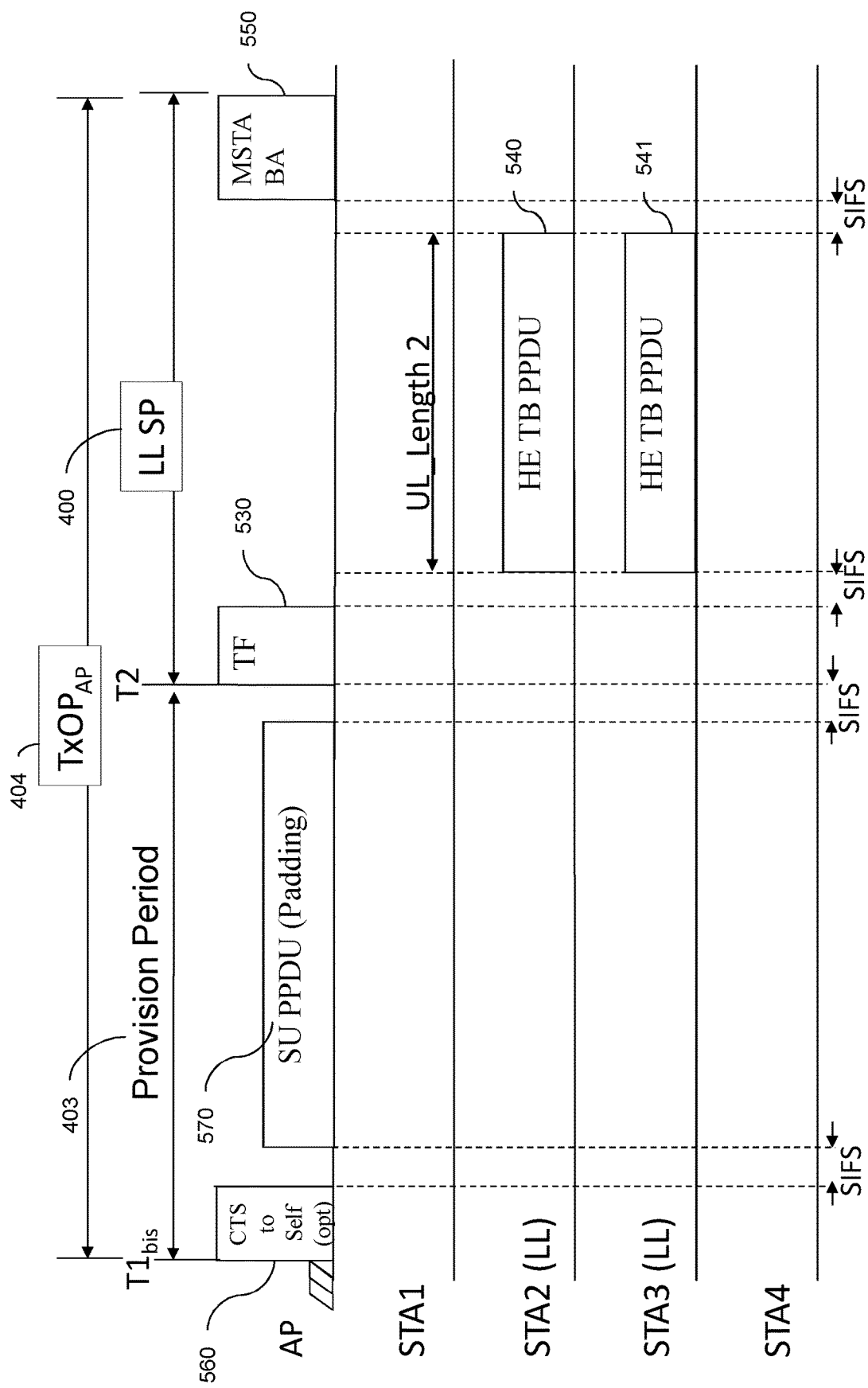

In case EDCA_Enabled is false (or is not present and its default value is false), at T2, the AP will initiate the transmission using a trigger frame 530 to trigger Uplink traffic as illustrated in FIG. 5a, or by initiating Single User (SU) DL or MU DL traffic. The initialization of a down link traffic may optionally include a medium protection sequence like an RTS/CTS exchange or a MU RTS/CTS exchange. Since the medium is normally already protected by the NAV mechanism setup at the beginning of the transmission (reservation) period 410, this optional protection sequence is dedicated to the protection against stations that may be in doze mode during the reservation period 410.

To avoid collision between transmissions of the AP and the LL capable STAs during the Provision Period 403, the AP may optionally include an indication EDCA_Provision_Enabled that indicates, in a frame transmitted by the AP during the transmission period 410, if the provision period 403 allows EDCA based contention access by stations when the medium becomes available (for concerned STAs) during that period. The stations that are allowed to contend for access during the PP 403 may be limited to LL capable STAs or to STAs that commit to release the medium prior the start of the LL SP 400. The indication may also be included in the declaration of the LL SP for instance in an information element of a beacon frame.

In case EDCA_Provision_Enabled is false (or is not present and its default value is false), at T1bis, the AP will initiate the transmission using a reservation frame 410 (as described in FIGS. 5a to 5e), and no station is allowed to contend to access the medium until the beginning of the LL SP.

In a variant, if EDCA_Enabled is true (or is not present and default value is true), one or more of the LL STAs will try to access the medium at the starting of the LL SP 400. In order to handle correctly the collision between those stations and potentially between those stations and the AP, LL SP stations may use an alternative set of EDCA parameters values (LL_EDCA Parameter Set) to handle the collision and congestion control during the LL SP. LL_EDCA Parameter Set may contain one or more different (adapted) values of the EDCA parameters like TxOPLimit indicating the maximum duration of a LL SP transmission, AIFS that indicates the minimum waiting time before counting down the EDCA backoff counters, the maximum congestion window value used to randomly select the EDCA backoff counters, or other EDCA parameters. In another variant, the EDCA medium access during the LL SP period may rely on a dedicated EDCAF (EDCA Function) that handles dedicated backoff counters and could apply different medium access rules.

At the end of the $TXOP_{AP}$ period 404, conventional EDCA medium access mechanism may be executed by any station (including the AP) to gain access to the medium and start a new transmission period 440 not restricted to Low Latency traffic. In a variant, at the end of the LL SP 400 and prior the end of the $TxOP_{AP}$ period 404, transmissions not restricted to Low Latency traffic may be performed under the control of the AP.

FIG. 5a illustrates a time sequence to schedule precisely the starting time of the Low Latency Service Period (LL SP 400) according to an implementation of the invention where the Provision Period 403 is used by the AP to trigger a Multi User Uplink communication with the regular (non-LL) stations, and initiate the LL SP 400 by a trigger Frame (TF) 530 to poll Low Latency stations in a Multi User Uplink communication.

In this implementation, at $T1_{bis}$, the AP gains the medium, compute the duration of the TxOP, and sends a trigger frame 500 that reserve the medium for a $TxOP_{AP}$ 404 duration. The TF 500 optionally contains the LSP indication and/or the EDCA_Enabled indication. In this example, if the LSP indication is present, this indication is set to true and the EDCA_Enabled indication (if present) is set to False. Those indications are typically present in the Common Info field 810 (FIG. 8a) of the TF 500.

Figure 8A:
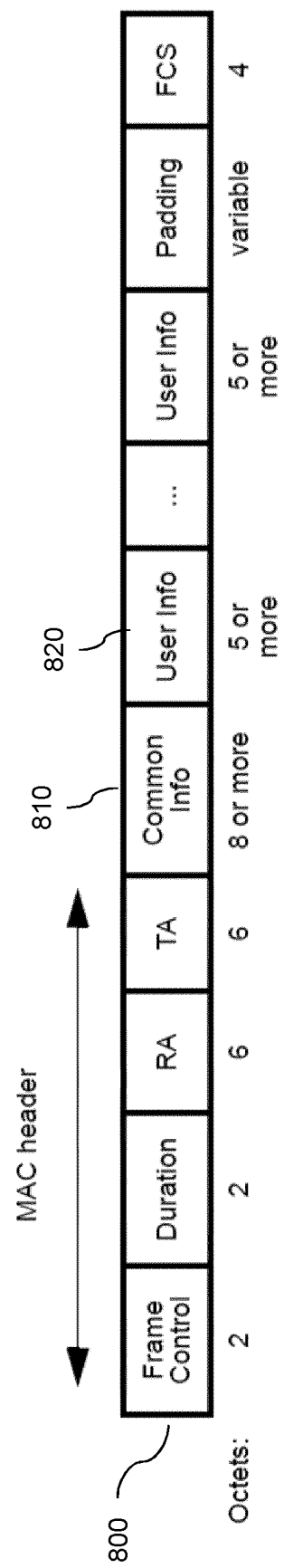
FIG. 8a illustrates the format of a trigger frame as described in the 802.11ax standard to perform MU UL OFDMA transmissions.

The trigger frame 500 also indicates the duration UL_Length 1 of the triggered PPDU 510 and 511 in the field UL_Length 830 (FIG. 8a). This duration being determined by the AP to guaranty that the medium is free at T2. Typically, UL_Length1=T2-T1$_{bis}$-(TF 500 duration)-3× SIFS-(MSTA BA 520 duration); where MSTA BA 520 is a Multi station Block Ack. The AP is able to determine those durations since it knows the modulation scheme used and the size of the corresponding packets (both TF 500 and MSTA BA 520).

Upon reception of the TF 500, the non-LL (regular) stations STA1 and STA4 addressed by the AP in the TF 500 send a Trigger Based PPDU (TB PPDU) (respectively 510 and 511) using the transmission parameters received in the TF 500 in the User Info Field addressed to regular stations.

The AP then transmits a Multi Station Block Ack 520 to acknowledge the received TB PPDUs.

A SIFS after the end of the transmission of the MSTA BA 520, the AP initiates the LL SP by sending a TF 530 that addresses LL Stations (STA2 and STA3 in this example). The TF 530 indicates a new duration UL_Length 2 for the TB PPDU 540 and 541. The AP then finishes the LL SP period by acknowledging the received TB PPDU in a MSTBA 550.

FIG. 5b illustrates a time sequence to schedule precisely the starting time of the Low Latency Service Period (LL SP 400) according to an implementation of the invention where the Provision Period 403 is used by the AP to send data to a single regular station, and initiate the LL SP 400 by a trigger Frame (TF) 530 to poll Low Latency stations in a Multi User Uplink communication.

In this example, the AP initiates the Provision Period 403 by sending a Single User PPDU to a regular station. A protection sequence (CTS to self in the example, RTS/CTS, or MU RTS/CTS) may optionally be present before the start of the SU transmission. This protection sequence may include a frame including the optional indications LSP and/or EDCA_Enabled (for instance in a MU RTS TF as described in the previous implementation, or in a new variant of the RTS or CTS frames).

In an implementation variant of the FIG. 5b, the SU PPDU 570 may not be addressed to a station (invalid destination address, or destination address corresponding to a station not registered to the AP), and the SU PPDU may contain only padding. This variant allows to keep the medium busy for a short period of time, especially, if the duration of the Provision Period 403 does not permit to setup a full communication (including data transmission and associated acknowledgment) with a regular station.

The rest of the sequence (LL SP period) is identical to the FIG. 5a.

Figure 5C:
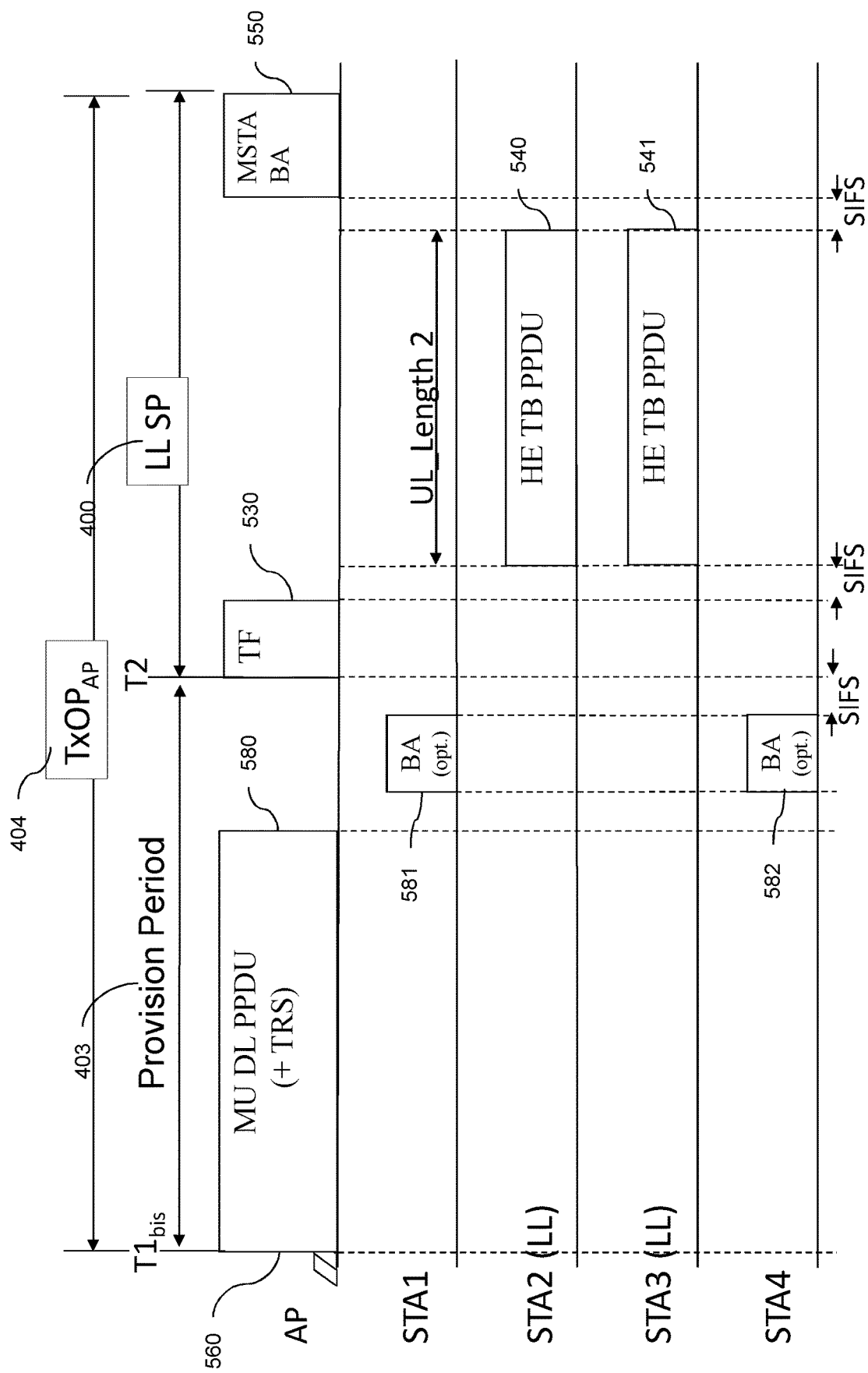

FIG. 5c illustrates a time sequence to schedule precisely the starting time of the Low Latency Service Period (LL SP 400) according to an implementation of the invention where the Provision Period 403 is used by the AP to send simultaneously data to several regular (non-LL) stations, and initiate the LL SP 400 by Multi User Downlink PPDU 580. This MU DL PPDU may include an indication for the destination regular stations to acknowledge the received PPDU in a multi User Uplink PPDU. For example, this may be done by the AP by integrating a TRS A-Control field in the PPDU addressed to the STA, as described by the IEEE 802.11ax specification.

The destination regular station then acknowledges the received PPDU using the TRS indication.

After the reception of the BA 581 and 582 sent by the regular stations, the AP initiates the LL SP as described in the previous figures.

Figure 5D:
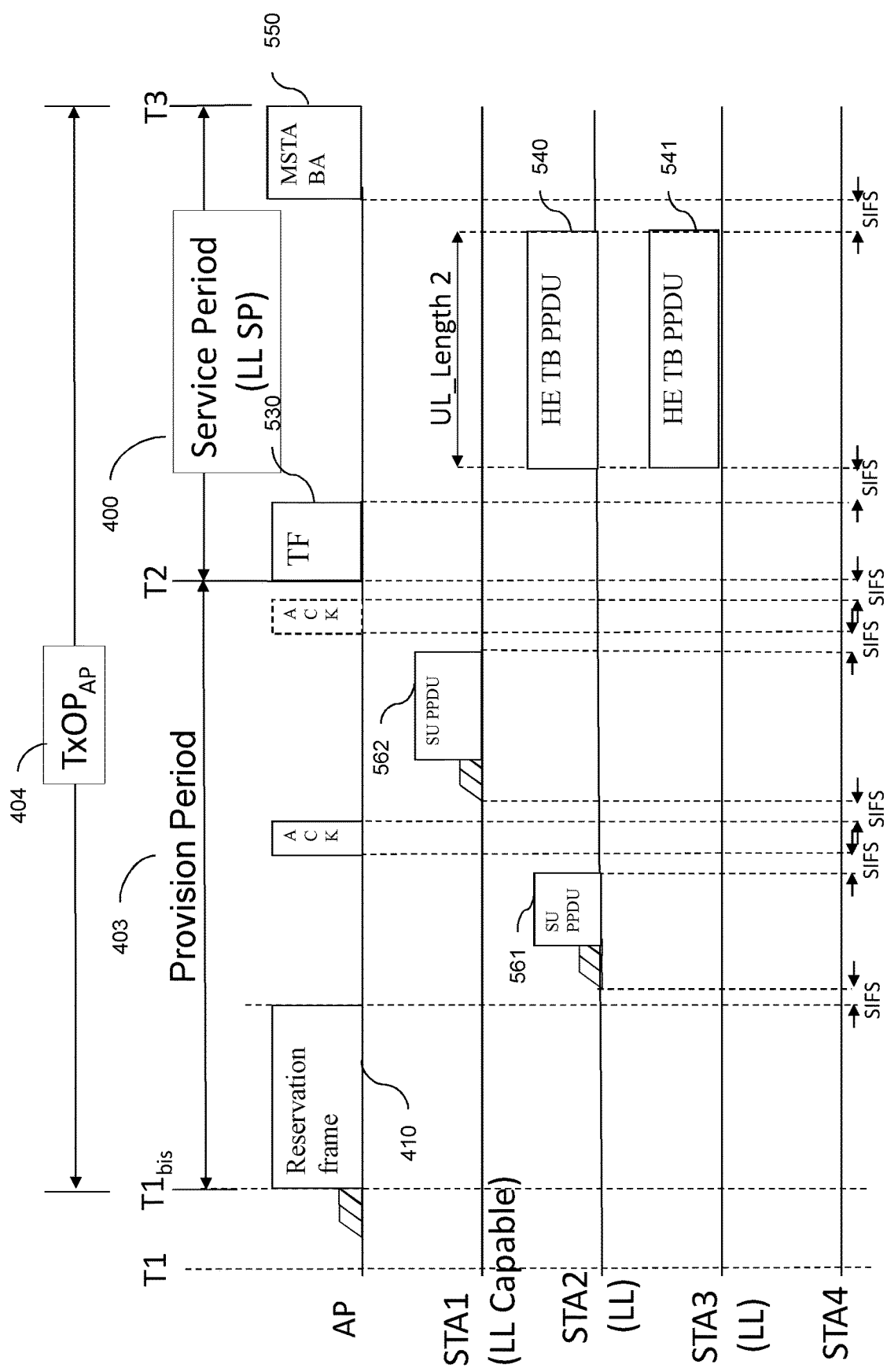

FIG. 5d illustrates a time sequence to schedule precisely the starting time of the Low Latency Service Period (LL SP 400) according to an implementation of the invention where it is permitted to stations to contend for access to the medium (for instance using EDCA) during the Provision Period 403. In this implementation, the frame reservation 410 can for instance be a trigger frame like a MU RTS trigger frame or a variant of the basic trigger frames as described in the 11ax amendment. In an embodiment, this reservation frame 410 may include an information EDCA_Provision Enabled indicating if the following period (the Provision Period 403 in this case) initiated by the reservation frame allows a contention based medium access despite the fact that the reservation frame 410 reserved the medium. In another embodiment, the EDCA_Provision_Enabled indication is included in a TWT information Element, announcing the LL SP. In a variant, only the stations supporting specific capabilities allowing to protect the starting time of the LL SP are allowed to contend for medium access during the provision period 403 when the medium becomes available (that is to say the medium becomes available only in view of the restricted set of stations having said capability, and the medium remains busy for other stations without said capability such as legacy stations). The specific capability indicating that a station supports (or commits to) the protection of the LL SP, for instance by stopping its transmission or releasing the medium before the start of the LL SP, is referred to as Low Latency Protection capability. This capability may be different from the capability of a station to send Low Latency traffic.

In the example of FIG. 5d, STA1 is supporting the Low Latency Protection capability and when it gains the medium to send an SU PPDU 562, it computes the duration of this PPDU 562 to ensure that its transmission will finish (at least) a SIFS before the start of the LL SP. In case where this PPDU 562 requires an immediate Ack or Block Ack by the AP, the station STA1 computes the duration of the PPDU 562 so that the Ack sent in response by the AP finishes a SIFS before the start of the LL SP.

Figure 5E:
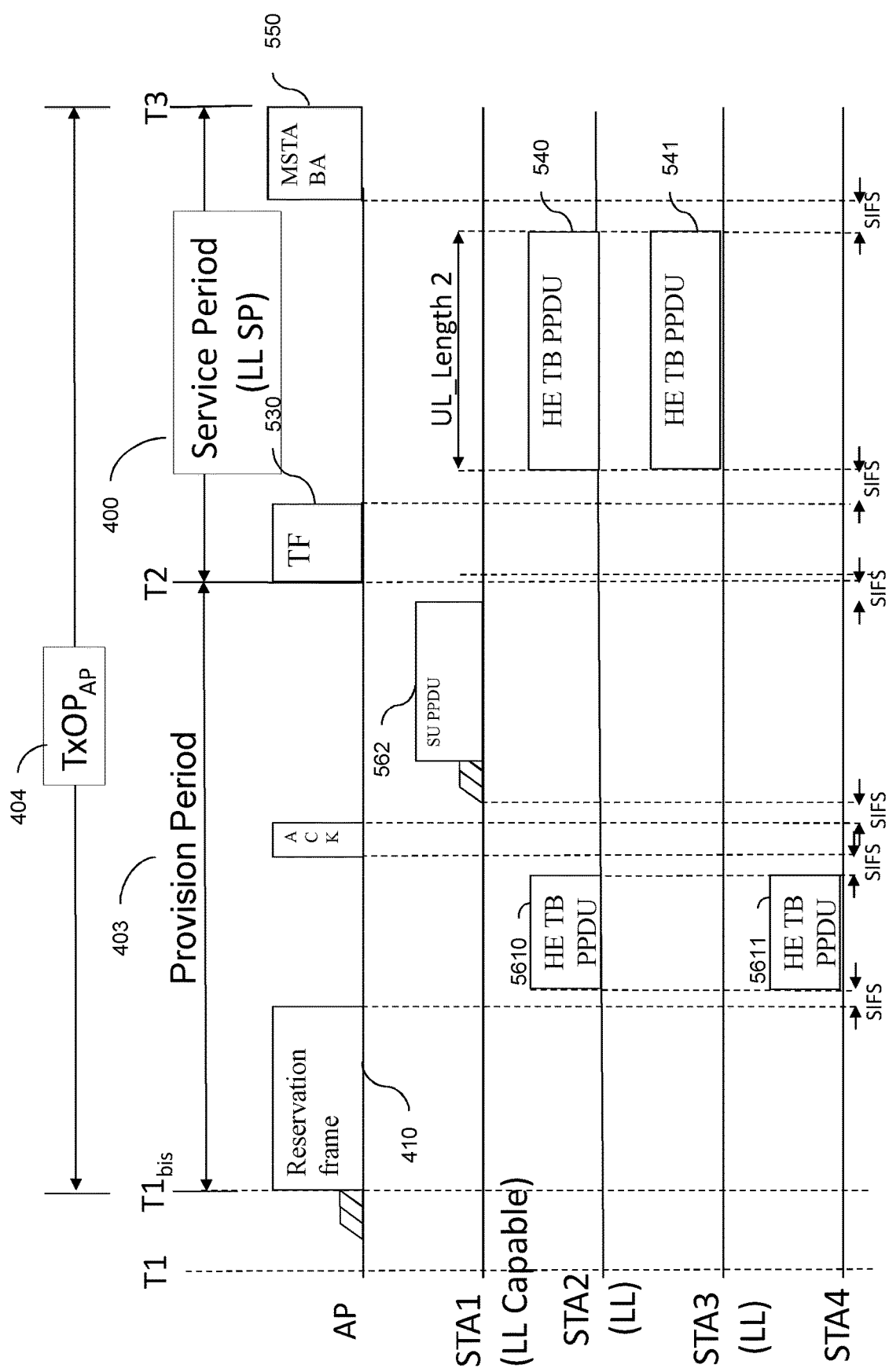

FIG. 5e illustrates a time sequence to schedule precisely the starting time of the Low Latency Service Period (LL SP 400) according to an implementation of the invention where it is permitted to stations to contend for access to the medium (for instance using EDCA) during the Provision Period 403, after a trigger-based transmission (HE TB PPDU 5610 and 5611). In this implementation, the frame reservation 410 can for instance be a trigger frame like a MU RTS trigger frame or a variant of the basic trigger frames as described in the 11ax amendment. The trigger frame triggers a Multi User uplink transmission from stations identified by their AID in a user info field 820 of the trigger frame (FIG. 8a), or by allocating random access RU(s). In a variant, the reservation frames 410 includes an indication EDCA_Provision_Enabled. For example, STA1 that is Low latency capable (stations supporting the Low Latency Protection capability), contends to access the medium after the end of the Multi user Uplink sequence (HE TB PPDU 5610 and 5611 emission and corresponding Ack emission from the AP), and sends a PPDU 562 (SU PPDU as indicated on FIG. 5e, but a MU PPDU is also possible). In the example of FIG. 5e, the PPDU 562 doesn't require an immediate Ack from the AP: station STA1 can finish its PPDU 562 transmission a SIFS before the start of the LL SP.

FIGS. 5a to 5e describe implementations of embodiments of the invention by illustrating combination examples about the way the AP may handle the Provision Period 403 and LL SP 400. Of course, other combinations of provision period 403 and LL SP 400 are possible (for instance MU DL PPDU during the period 403 and EDCA access during the LL SP 400), but are not all described here.

Figures 6A, 6B:
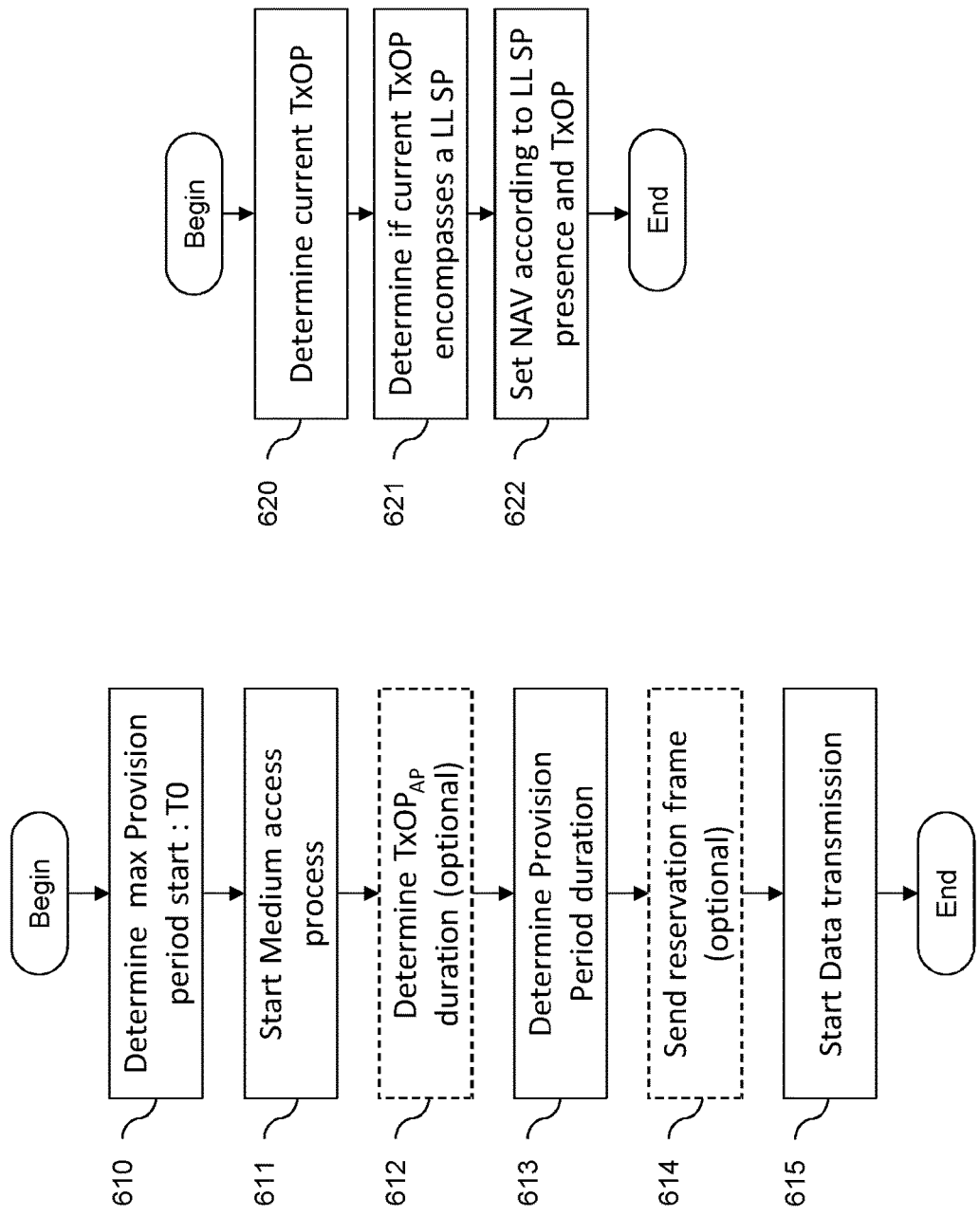
FIG. 6a illustrates, using a flowchart, operations of the AP according to embodiments of the invention.
FIG. 6b illustrates, using a flowchart, operations of a LL STA that does not support Low Latency Protection capability according to embodiments of the invention at the start of a Provision Period.

FIG. 6a illustrates, using a flowchart, operations of the AP according to embodiments of the invention.

The algorithm starts upon medium access tentative by the AP. For example, if the AP has data to transmit, or if the AP determines it is time to gain the medium to protect a LL SP.

At step 610, the AP determines the start instant T0 of the MaxProvisionTime Period. For example, T0=T2−MaxProvisionTime as described in FIG. 4.

At step 611 (T1 instant), the AP starts the medium access process. For example, if the medium is free, the AP counts down the backoff counter and when the backoff counter reaches 0, the AP accesses the medium (at T1 bis).

At step 612, the AP determines the duration of the AP transmission opportunity (duration of the total medium reservation). In some embodiments, this value is fixed.

If the start of the medium access process is succeeding T0 (medium access during the Max provision period), the AP determines the transmission duration that encompasses the LL SP as described in FIG. 4. For example, $TxOP_{AP}=T3-T1_{bis}$.

At step 613, the AP determines the provision period 403 duration ($TxOP_{AP}$−LL SP duration).

At step 614, the AP prepares and sends a reservation frame (for instance a TF 500, or a CTS 560 as described in the FIG. 5a, 5b, 5d, 5e or 7). This step is optional since the data transmission during the Provision Period 403 can directly starts with a data transmission like in the example of FIG. 5c. In case the reservation frame is present, the content of the reservation frame (e.g. $TxOP_{AP}$ value, presence and value of the optional indications LSP indication and EDCA_Enabled, and the value of the UL_Length field in the case of a trigger frame) is performed as described in FIGS. 4 and 5a to 5e.

At step 615, the AP starts data transmission with the regular (non-LL) stations following one of the embodiments described in FIGS. 5a to 5e.

FIG. 6b illustrates, using a flowchart, operations of a LL STA that does not support the Low Latency Protection capability, according to embodiments of the invention at the start of the Provision Period 403.

At step 620, the LL SP station receives the signaling (likely the first) frame of the regular transmission of the provision period. Even if this frame is not addressed to the LL STA, the station decodes the preamble of the frame and thus can determine the duration of the medium reservation indicated by the AP in the TxOP value.

At step 621, the LL STA determines if the current medium reservation encompasses a LL SP. This can be done by checking the presence of an LSP indication in the reservation frame (for instance in case of a trigger frame, the LL Station decodes the common info field and the user info field to determine if the AP reserved one or more of the resource units described in the TF to it).

If the LSP indication is not present, the LL station may determine if the current TxOP encompasses a LL SP by verifying if the starting time of the (following) LL SP (received in a previous beacon for instance) is included in the current TxOP.

If the current TxOP includes a LL SP, the LL STA set its NAV until the starting time of the LL SP, otherwise to the value of the current TxOP (step 622).

FIG. 6c illustrates, using a flowchart, operations of a station that supports the Low Latency Protection capability (it could be a LL station or a non-LL station that supports protecting the starting of the LL SP period), according to embodiments of the invention at the start of the Provision Period 403. Steps 620 and 621 are identical to the steps of FIG. 6b.

At step 631, the station determines if the EDCA_Provision_Enabled is true. If yes, step 632 is executed otherwise step 635 is executed. As described, this indication may be either (or both) present in a management frame issued by the AP (e.g. beacon frame) or in the reservation frame initiating the TxOP 404.

At step 632, the station that is Low Latency Protection capable tries to access the medium by contention. In an embodiment, the station may use an alternative set of EDCA parameter values (AIFSN and Congestion window) that can be different per Access category or unique for all Access Categories. Such alternative set of EDCA parameters can be known by default, or sent by the AP in an information element present in a beacon or probe response frame. In an embodiment, the station may maintain, one dedicated backoff counter or one per Access Category (to be used during a provision period), different from the backoff counters used for nominal EDCA (outside of the provision period).

At step 633, the station accesses the medium and computes its transmission duration so that the transmission (including an optional Acknowledgement) ends before the start of the LL SP (for example at least a SIFS before the start of the LL SP).

At step 635, the station may set its NAV. In one implementation, if the current TxOP includes an LL SP and the station is a LL STA then the station does not set its NAV, otherwise, the station sets its NAV until the end of the current TxOP. In a variant, a non-LL STA does not set its NAV if it is allowed by the AP to contend to access the medium during the Provision Period.

It should be noted that the AP, by essence, is also a station that supports the Low Latency Protection. Thus, the group of steps referenced by 630 may also be executed by the AP. In an embodiment, the AP may use degraded or other contention parameters to let other non-AP stations with the protection capability (like STA1 in example of FIG. 5*e*) taking precedence onto the wireless medium. The AP may act as a fallback solution in case no other non-AP station has traffic to emit during this provision period by sending its own or padding traffic.

Figure 7:
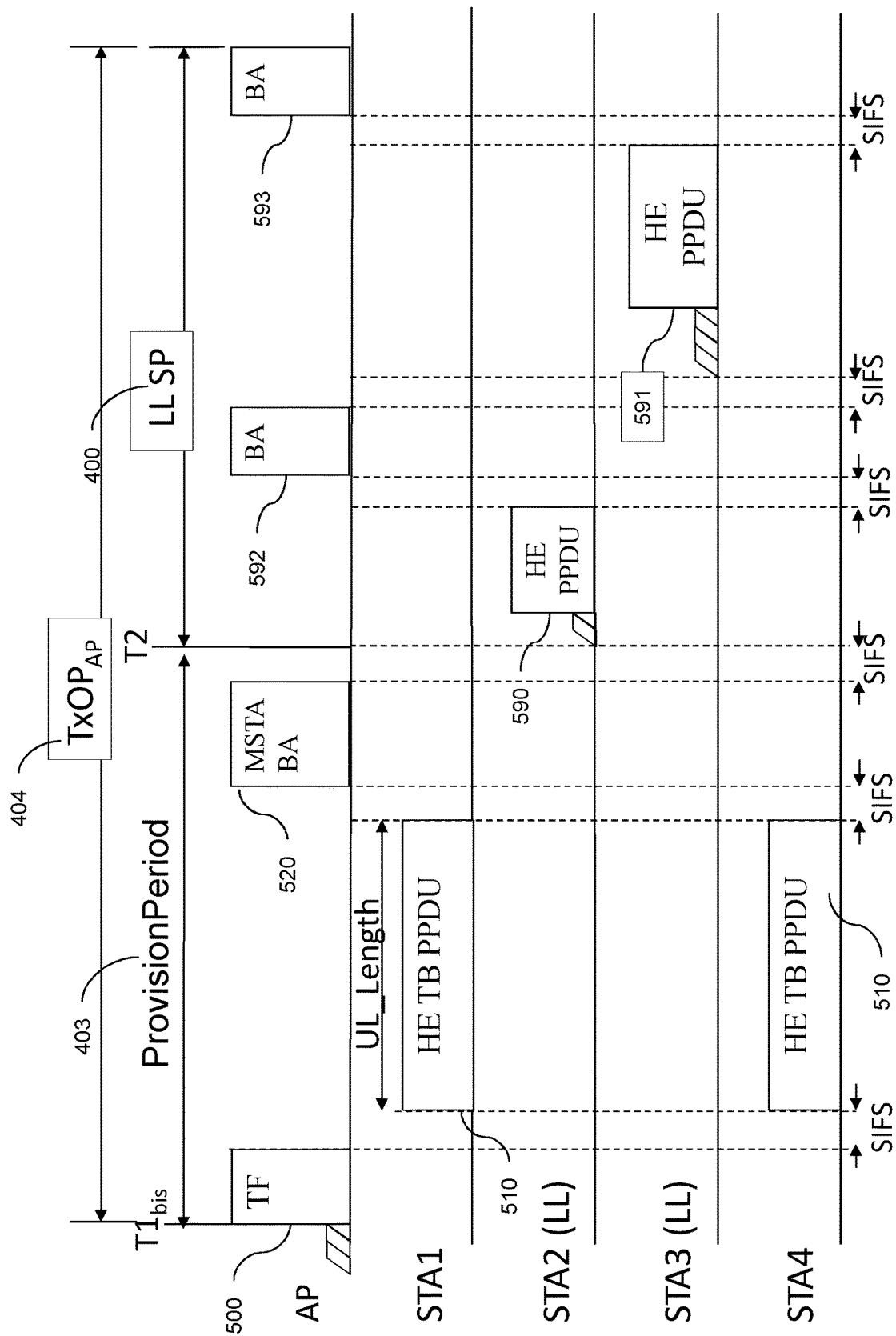
FIG. 7 illustrates, a time sequence to schedule precisely the starting time of the Low Latency Service according to another implementation of the invention.

FIG. 7 illustrates, a time sequence to schedule precisely the starting time of the Low Latency Service Period (LL SP 400) according to an implementation of the invention where the Provision Period 403 is used by the AP to trigger a Multi User Uplink communication with the regular stations as described in FIG. 5*a*, and free the medium for the LL STA to access the medium during the LL SP 400 using the EDCA medium access scheme.

In this implementation, the beginning of the sequence (Provision Period 403) is identical to FIG. 5*a*, but after the end of the transmission of the MSTA BA, the AP stops transmitting to let LL SP stations contend for access the medium during the LL SP. It is worth noting that here, upon reception of the TF 500, the LL SP stations do not set their NAV until the end of the TxOP$_{AP}$ duration indicated in the TF 500, but only to T2. This lets the LL stations try access the medium on T2.

The LL SP stations may optionally update their EDCA parameter values (as indicated if the FIG. 4) before T2 using an updated (e.g. adapted) set of values (LL EDCA parameter set) transmitted by the AP for example in the common info field of the TF 500, or in one of the beacons transmitted before the start of the LL SP 400.

In the illustrated implementation, LL STA2 and LL STA3 alternatively access the medium to send uplink data to the AP. Of course, during a LL SP, the number of Low Latency transmissions is only limited by the end of the LL SP and can contain one or more PPDU transmissions form one or more LL STAs.

Of course, this implementation allowing EDCA access during the LL SP, is also compatible with any of the embodiments of the provision period (FIGS. 5*a* to 5*e*).

FIG. 8*a* illustrates the format of a trigger frame as described in the 802.11ax standard to perform MU UL OFDMA transmissions.

The trigger frame 800 contains several fields as defined in the IEEE standard 802.11ax and in particular it includes a single Common Info field 810 (FIG. 8*b*) and a plurality of User Info fields 820.

Each User Info field 820 defines the assignment of the RUs defined in the Common Info field 810 to respective non-AP stations 101-107, as well as communication parameters to respect for UL communication with the AP.

Figure 8B:
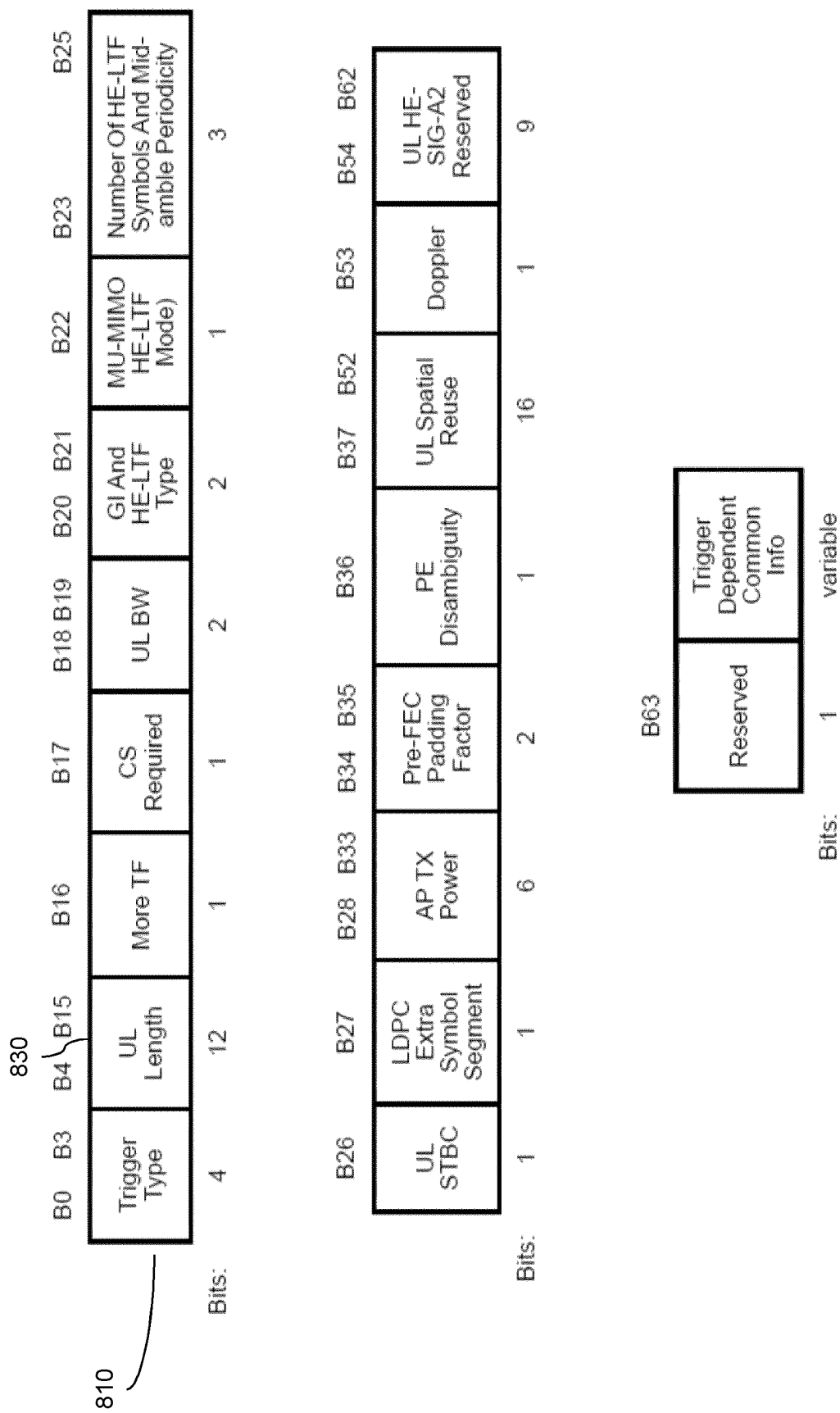
FIG. 8b illustrates the format of Common Info field as described in the 802.11ax standard to perform MU UL OFDMA transmissions.

FIG. 8*b* illustrates the format of Common Info field as described in the 802.11ax standard to perform MU UL OFDMA transmissions. The Common Info field 810 contains UL Length field 830 for the UL PPDU length.

As described above according to embodiments of the invention, the use of a provision period allows to secure the starting time of the service period. This is particularly advantageous when, for example, a precise starting time of the service period is needed, the AP needs a strong control on the Quality of Service (QoS) or on stations allowed to access the medium, or to protect the medium from legacy stations as well as stations associated with an overlapping basic service set (OBSS)—a BSS operating on the same channel as the current BSS and within (either partly or wholly) its basic service area. There may exist however circumstances under which it is preferable for the AP to not use the provisional period. These circumstances may be for example if the network is underloaded; the AP can thus get access to the medium nearly at the time the AP tries to access. Also, although certain stations (e.g. LL STAs) may still be allowed to access the medium during the provision period as discussed above, the AP may have to send padding during the provisional period if not enough data is transmitted during that period, for example if most of the transmission needs come from legacy stations.

The foregoing concern is addressed according to another aspect of the invention by considering an optional provision period and the related signaling means.

Figures 11A, 11B:
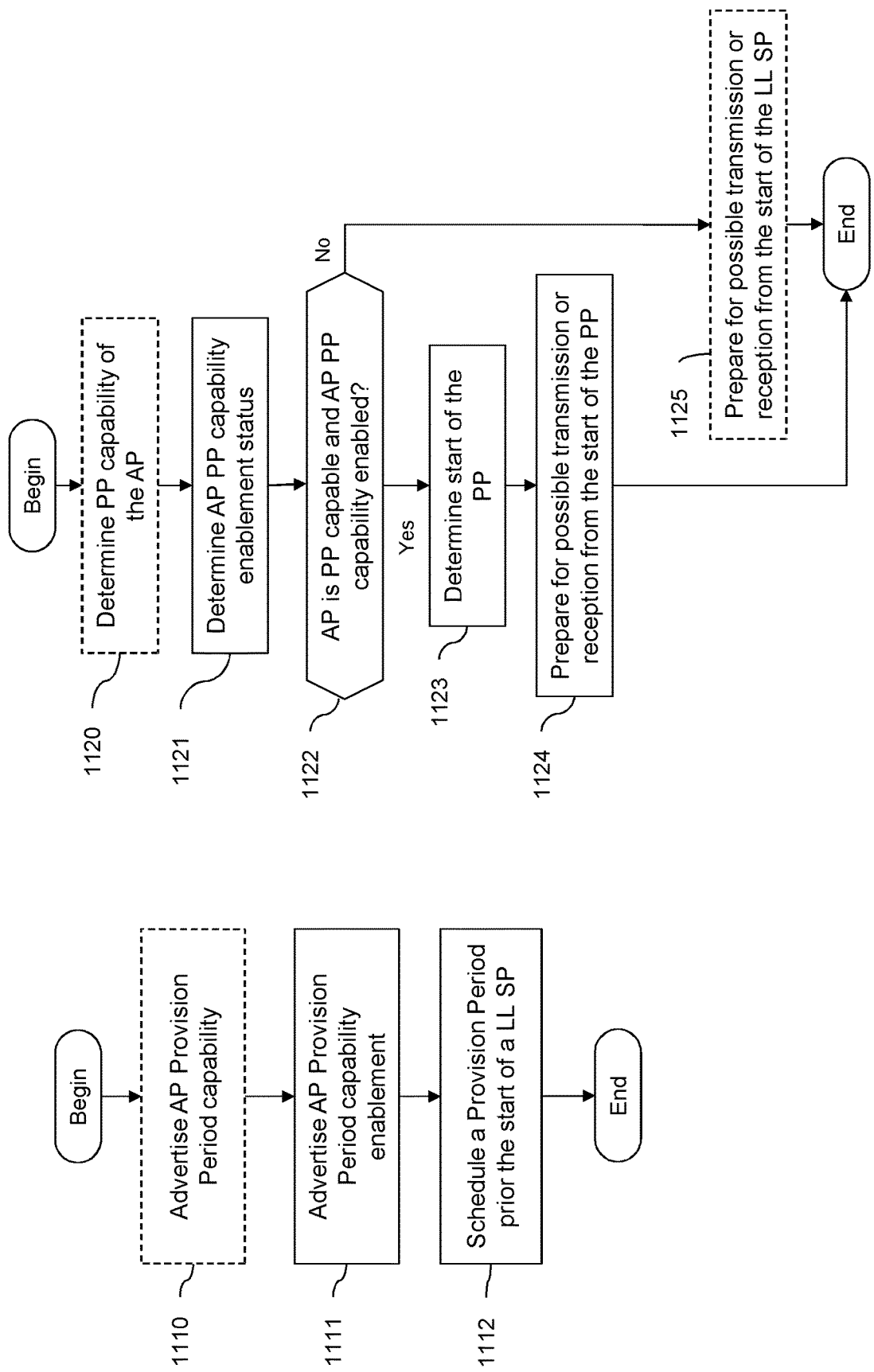
FIG. 11a illustrates, using a flowchart, operations of the AP according to embodiments of the invention.
FIG. 11b illustrates, using a flowchart, operations of a low latency station according to embodiments of the invention.

According to embodiments of this other aspect of the invention, the AP advertises about its capabilities regarding the use of the provision period, and/or about the provision period capability enablement, as illustrated for example in FIG. 11*a*.

FIG. 11*a* illustrates, using a flowchart, operations of the AP according to embodiments of the invention.

At step 1110, the AP advertises its provision period capability. Note that an AP may not have the PP capability by design, i.e. it does not support or implement the function, and thus acts as a legacy AP. According to embodiments of the invention, the AP may signal its PP capability through the Capability Information (as described in the subclause 9.4.1.4 of 802.11 series of standards) that is encapsulated for instance in the Beacon frame, Probe response, or association frames. In a preferred implementation, the AP signals its PP capability when exchanging its capabilities with stations during an association phase.

At step 1111, the AP advertises its provision period capability enablement. Note that an AP that is PP capable may still have the possibility to enable or disable its PP function. In other words, an AP that is PP capable may be configured to disable (or enable) the PP function, for example depending on network conditions (number of stations, type of stations, number of collisions, etc.). According to embodiments of the invention, the AP may signal its PP capability enablement status (enabled/disabled) using a management frame (e.g. beacon frame), a control frame or a dedicated frame (e.g. the reservation frame). An exemplary implementation using a TWT Information Element (IE) when considering a TWT SP is provided with reference to FIGS. 10*b* and 10*c*. The LSP indication discussed above may also be used for the signalling.

At step 1112, and after advertising that the PP capability is enabled, the AP schedules the provision period prior the start of the service period. Reference can be made to the description of FIGS. 1 to 7 showing different variants for scheduling the PP.

When the LL Capable EHT AP accesses the medium during a MaxProvisionTime before the start of the LL SP, it reserves a TXOP time that encompasses the next LL SP. The reservation frame may contain an information allowing EDCA mode during the Provision Period. In an embodiment, When EDCA is allowed during the provision period, only LL Capable EHT STAs are allowed to contend the medium.

The AP may initiate MU/SU data transmissions (DL/UL) to solicit any STAs of the BSS. Data transmissions are not restricted for low-latency flows.

Figure 10B:
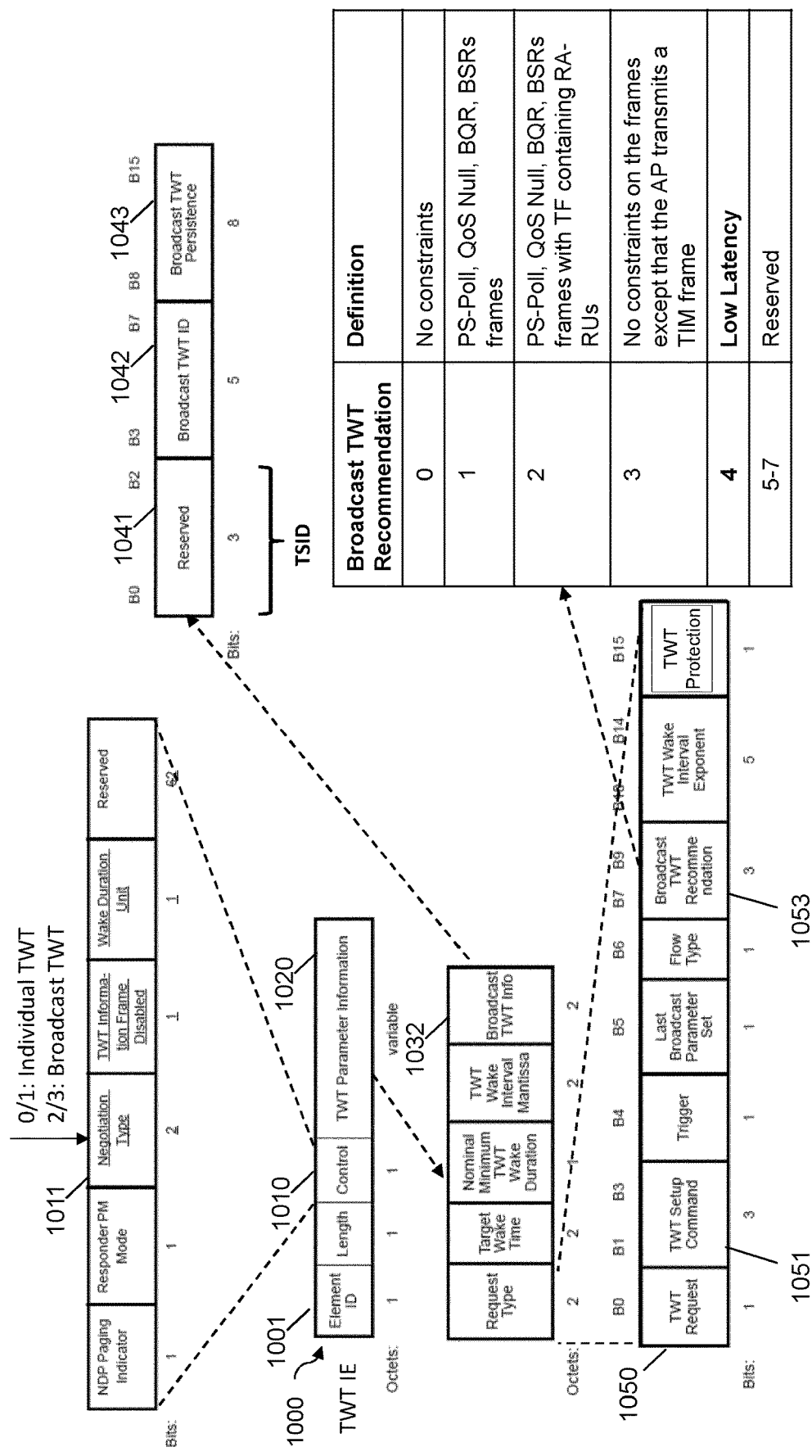
FIGS. 10b and 10c illustrate different embodiments for the format of the TWT Information Element containing an information enabling the Provision Period.
Figure 10C:
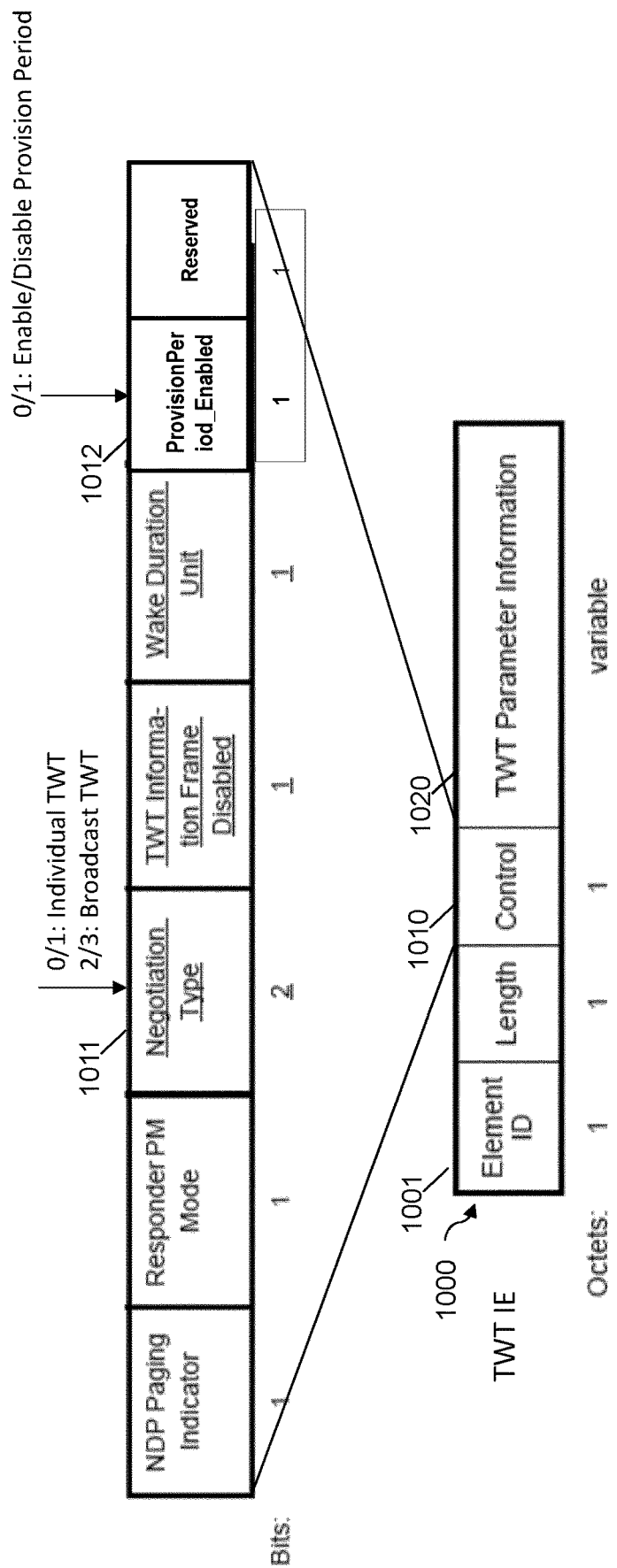

FIGS. 10b and 10c show example formats, according to embodiments of the invention, of a TWT information element that may be used to signal AP PP enablement status. The information element may be included in a management frame, such as a beacon frame.

The low latency services may be based on at least one of 2 main LL requirements:
  when some low-latency packets have to be transmitted by a STA, the STA must get the medium access on a precise date (time-sensitive traffic).
  To be efficient, the transmission of low-latency frames must be short to give transmission opportunities to many LL STAs and to avoid to penalize heavily all other non-LL STAs (latency-sensitive traffic).

Note that an EHT STA that supports stopping their transmission before the starting time of the LL SP is defined as a Low-Latency (LL) Capable EHT STA. In other words, a Low-Latency (LL) Capable EHT STA is an EHT STA that supports stopping its transmission before the starting time of the LL SP.

To fulfill the low latency requirements, a new value for the "Broadcast TWT recommendation" field 1053 dedicated to low latency frames transmission is defined (for instance value=4). For example, if field 1053 has its value set to this new value, the solicited STA has to transmit only low latency frames and no other frames. A low latency frame may be identified by its associated traffic stream identifier (TSID). The 802.11 standard defines 8 values of TSIDs. Optionally, to be more precise, the traffic stream identifier could be identified by using the "Reserved" 3-bit field 1041.

The granted TxOP implies for the non-LL stations to set their NAV (Network Allocation Vector) preventing any data transmission from these stations. The provision period cannot be present all the time or cannot be implemented on all APs. That is the reason why the presence of the provision period is advertised by the AP through the TWT information element 1000.

In a first embodiment, as described in FIG. 10b, the presence of the provision period is enabled thanks to the bit 15 "TWT Protection" when it is set to 1 for instance. For a broadcast TWT, this bit is reserved in the 802.11-2016 standard and can be used for enabling the provision period. For an individual TWT, this bit is already used to promote the fact that the corresponding TWT service period is protected. The AP sets the "TWT Protection" bit (bit 15) to 1 for a broadcast TWT for low-latency traffics to indicate that the LL TWT SP will be NAV-protected before the start time of the LL TWT SP. In the case that the Individual TWT is dedicated for low latency traffic, the function of this "TWT Protection" bit is overloaded to enable the provision period. Thus, The Provision Period is announced in the TWT IE with the Bit 15«TWT Protection» used for an Individual TWT.

In a second embodiment, as described in FIG. 10c, one of the "Reserved" bits of the Control field 1010 is allocated to enable the provision period. This allocation is valid for any kind of TWT, broadcast or individual.

Broadcast TWT for low-latency traffics (LL TWT) restricts the TWT service period to only low-latency traffic transmission Low-latency traffic restriction is signaled by adding a new value in the "Broadcast TWT Recommendation" field.

The LL TWT SP and associated NAV-protected mechanisms as defined ensures:
  the cancellation of collisions among STAs acting inside the LL SPs;
  that the AP keeps the control of the medium during all the LL SP;
  the QoS is driven by the AP; and
  guarantees a more predictive access to the medium for low-latency traffics and peer-to-peer communications.

FIG. 11b illustrates, using a flowchart, operations of a low latency station according to embodiments of the invention.

At step 1120, the station retrieves the PP capability of the AP, for example when the station associates with the AP.

At step 1121, the station determines the AP PP capability enablement status (enabled/disabled) by means the signaling discussed above. For example, the status is determined from a TWT IE advertised by the AP. In a variant, the PP capability enablement status is signaled in the reservation frame transmitted by the AP. In a further variant, the PP capability enablement status is signaled by means of the LSP indication described above.

If the AP is not PP capable or its PP capability is not enabled (test 1122 negative), no provision period is implemented by the AP and the station performs normal operations such as preparing for sending or receiving data during the LL SP (considering that the station is LL capable).

If the AP is PP capable and its PP capability is enabled (test 1122 positive), the station determines the start of the provision period (1123), corresponding to the start of the reserved AP TxOP, and prepares for possible transmission or reception from the start of the provision period (1124).

Preparing for possible transmission or reception may comprise setting appropriately the NAV of the station based on the PP capability enablement status.

For example, following a positive test at step 1122, the AP may enable scheduling transmissions during the provision period (and the service period). The AP may allocate resources for LL and/or non-LL traffic transmission during the provision period (e.g. by allocating multi-user downlink and/or uplink resource units). The AP may also authorize LL STAs to contend for access during the LL PP and/or LL SP (e.g. using EDCA). Because LL STAs may be authorized to access the medium during the AP TxOP, LL STAs do not set their NAV during at least part or all of the AP TxOP duration. On the other hand, non-LL STAs have their NAV set and view the medium as busy during that same period (and from the start of the reserved AP TxOP). Only LL capable EHT STA can contend to access the medium during a Provision Period.

A station may determine the start of the provision period using different means. For example, if the station observes that a reservation frame reserves a TxOP for the AP after the start of the maximum provision time period T0 (MaxProvisionTime), then the station considers that the provision period starts at the beginning of that TxOP. Note that, as discussed with reference to FIG. 4, T0=T2−MaxProvisionTime, where T2 is the starting time of the LL SP (advertised, e.g. in a beacon frame). In a variant, two conditions need to be fulfilled for the station to consider that the provision period starts at the beginning of that TxOP: the AP TxOP starts after T0 and the AP TxOP encompasses both the remaining time until the start of the service period (which would correspond then to the provision period) and the service period.

In the above example, the signaling is implicit as the station deduces the start of the PP from based on timing information. In a variant, an explicit signaling may be used for example in the reservation frame that reserves the AP TxOP starting the provision period.

Note that step 1120 is optional as the station may rely only on the PP capability enablement status. Thus, in a variant of the above flowchart (not illustrated), the station skips determining the PP capability status of the AP and bases test 1122 only on the PP capability enablement status. In this case, test 1122 is positive if the AP PP capability is enabled and negative if the AP PP capability is disabled.

According to an implementation, LL Capable EHT STA sets their NAV, at the starting time of the Provision Period, until the starting time of the LL TWT SP unless the AP allows EDCA mode during the Provision Period. Non-LL Capable STAs (legacy STAs or Non-LL Capable EHT STAs) and OBSS STAs set their NAV, at the starting time of the provision period, until the end of the $TXOP_{AP}$.

Figure 9B:
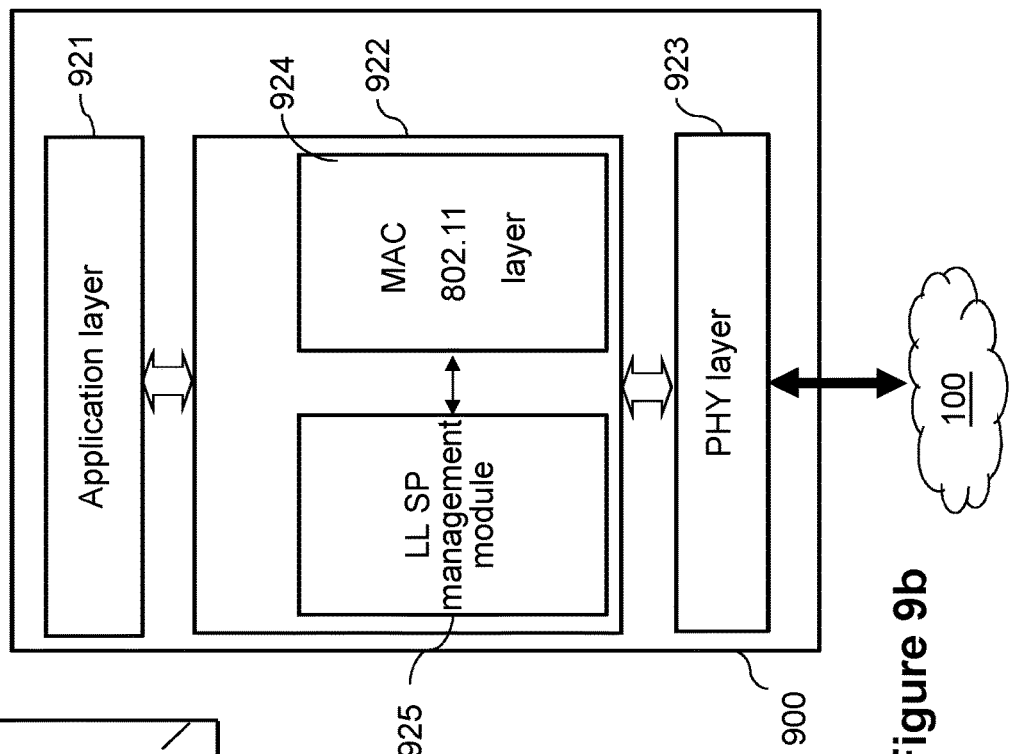
FIG. 9b is a block diagram schematically illustrating the architecture of the communication device.
Figure 9A:
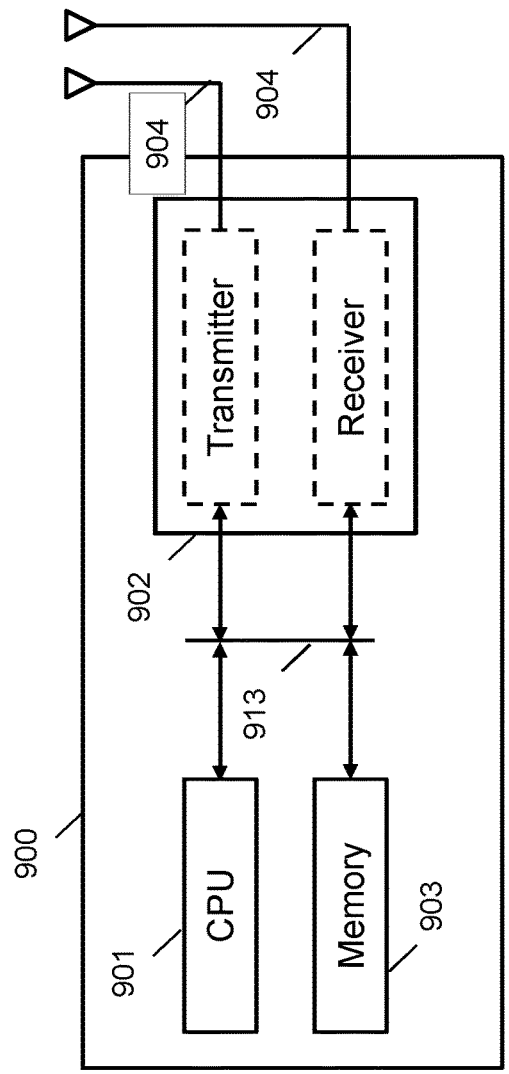
FIG. 9a schematically illustrates a communication device.

FIG. 9a schematically illustrates a communication device 900, either a non-AP station 101-107 or the access point 110, of the radio network 100, configured to implement at least one embodiment of the present invention. The communication device 900 may preferably be a device such as a micro-computer, a workstation or a light portable device. The communication device 900 comprises a communication bus 913 to which there are preferably connected:

- a central processing unit 901, such as a processor, denoted CPU;
- a memory 903 for storing an executable code of methods or steps of the methods according to embodiments of the invention as well as the registers adapted to record variables and parameters necessary for implementing the methods; and
- at least one communication interface 902 connected to a wireless communication network, for example a communication network according to one of the IEEE 802.11 family of standards, via transmitting and receiving antennas 904.

Preferably the communication bus provides communication and interoperability between the various elements included in the communication device 900 or connected to it. The representation of the bus is not limiting and in particular the central processing unit is operable to communicate instructions to any element of the communication device 900 directly or by means of another element of the communication device 900.

The executable code may be stored in a memory that may either be read only, a hard disk or on a removable digital medium such as for example a disk. According to an optional variant, the executable code of the programs can be received by means of the communication network, via the interface 902, in order to be stored in the memory of the communication device 900 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 9b is a block diagram schematically illustrating the architecture of the communication device 900, either the AP 110 or one of stations 101-107, adapted to carry out, at least partially, the invention. As illustrated, device 900 comprises a physical (PHY) layer block 923, a MAC layer block 922, and an application layer block 921.

The PHY layer block 923 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 210 (FIG. 4b) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 922 preferably comprises an 802.11 MAC layer 924 implementing conventional 802.11ax MAC operations, and additional block 925 for carrying out, at least partially, the invention. The MAC layer block 922 may optionally be implemented in software, which software is loaded into RAM 912 and executed by CPU 911.

Preferably, the additional block 925, referred to as Triggered MU Tx management module for triggered MU transmissions following a medium access trigger frame through OFDMA resource units (sub-channels), implements the part of embodiments of the invention (either from station perspective or from AP perspective).

802.11 MAC layer 924, LL SP management module 925 interact one with the other in order to process accurately the starting and management of the Low Latency Service Periods according to embodiments of the invention.

On top of the Figure, application layer block 921 runs an application that generates and receives data packets, for example data packets such as a video stream. Application layer block 921 represents all the stack layers above MAC layer according to ISO standardization.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network, comprising at a station:
    determining a transmission opportunity reserved by an access point (AP) of the wireless network using a Multi-User Trigger Frame;
    receiving an indication from the AP in the Multi-User Trigger Frame, the indication causing the station to not set its Network Allocator Vector (NAV) during a period of the AP transmission opportunity; and
    transmitting a Single User (SU) Physical Packet Data Unit (PPDU) in the period during which the NAV is not set, wherein the AP transmission opportunity encompasses a provision period prior to a start of a low latency (LL) service period (SP) dedicated for transmitting LL traffic.

2. The method of claim 1, wherein the period during which the station transmits the SU PPDU is part or all of the provision period.

3. The method of claim 1, wherein the indication causes the station to not set its NAV based on one or more capabilities of the station.

4. The method of claim 3, wherein the station does not set its NAV if it is a low latency capable station.

5. The method of claim 3, wherein the station has a LL service period protection capability, the capability is for the station to end transmitting prior the start of the LL service period.

6. A communication method in a wireless network, comprising at an access-point (AP):
sending a Multi-User Trigger Frame reserving an AP transmission opportunity, wherein the Multi-User Trigger Frame comprises an indication causing a station to not set its Network Allocator Vector (NAV) during a period of the AP transmission opportunity for the station to transmit a Single User (SU) Physical Packet Data Unit (PPDU) in the period during which the NAV is not set,
wherein the AP transmission opportunity encompasses a provision period prior to a start of a low latency (LL) service period (SP) dedicated for transmitting LL traffic.

7. The method of claim 6, further comprising receiving the SU PPDU from the station in the period during which the NAV is not set.

8. The method of claim 6, wherein the period during which the NAV of the station is not set, for transmitting the SU PPDU, is part or all of the provision period.

9. The method of claim 6, wherein the station is restricted to transmit only LL traffic during the LL SP.

10. A communication method in a wireless network, comprising at a signal generator:
generating a Multi-User Trigger frame designed to be sent by an access point (AP) for reserving an AP transmission opportunity in a wireless communication network,
wherein the Multi-User Trigger frame comprises an indication causing a station of the wireless communication network to not set its Network Allocator Vector (NAV) during a period of the AP transmission opportunity for transmitting a Single User (SU) Physical Packet Data Unit (PPDU) in the period during which the NAV is not set,
wherein the AP transmission opportunity encompasses a provision period prior to a start of a low latency (LL) service period (SP) dedicated for transmitting LL traffic.

11. A wireless communication station comprising:
one or more processors; and
one or more memories storing instructions that, when executed by the one or more processors, cause the wireless communication station to:
determine a transmission opportunity reserved by an access point (AP) of a wireless network using a Multi-User Trigger Frame;
receive an indication from the AP in the Multi-User Trigger Frame, the indication causing the station to not set its Network Allocator Vector (NAV) during a period of the AP transmission opportunity; and
transmit a Single User (SU) Physical Packet Data Unit (PPDU) in the period during which the NAV is not set,
wherein the AP transmission opportunity encompasses a provision period prior to a start of a low latency (LL) service period (SP) dedicated for transmitting LL traffic.

12. A wireless communication access point (AP) comprising:
one or more processors; and
one or more memories storing instructions that, when executed by the one or more processors, cause the wireless communication station to:
send a Multi-User Trigger Frame reserving an AP transmission opportunity, wherein the Multi-User Trigger Frame comprising an indication causing a station to not set its Network Allocator Vector (NAV) during a period of the AP transmission opportunity for the station to transmit a Single User (SU) Physical Packet Data Unit (PPDU) in the period during which the NAV is not set,
wherein the AP transmission opportunity encompasses a provision period prior to a start of a low latency (LL) service period (SP) dedicated for transmitting LL traffic.

13. A non-transitory computer-readable medium storing a program which, when executed by a microprocessor or computer system in a wireless device, causes the wireless device to perform the method of claim 1.

14. A non-transitory computer-readable medium storing a program which, when executed by a microprocessor or computer system in a wireless device, causes the wireless device to perform the method of claim 6.

* * * * *